United States Patent
Shtar et al.

(10) Patent No.: US 10,771,496 B2
(45) Date of Patent: Sep. 8, 2020

(54) INSIDER THREAT DETECTION UTILIZING USER GROUP DATA OBJECT ACCESS ANALYSIS

(71) Applicant: Imperva, Inc., Redwood City, CA (US)

(72) Inventors: Guy Shtar, Ness Ziona (IL); Shiri Margel, Petak Tikva (IL)

(73) Assignee: Imperva, Inc., Redwood City, CA (US)

( * ) Notice: Subject to any disclaimer, the term of this patent is extended or adjusted under 35 U.S.C. 154(b) by 269 days.

(21) Appl. No.: 15/673,932

(22) Filed: Aug. 10, 2017

(65) Prior Publication Data
US 2019/0028504 A1 Jan. 24, 2019

Related U.S. Application Data

(60) Provisional application No. 62/534,057, filed on Jul. 18, 2017.

(51) Int. Cl.
*G06F 21/50* (2013.01)
*G06F 21/55* (2013.01)
(Continued)

(52) U.S. Cl.
CPC .......... *H04L 63/1441* (2013.01); *G06F 21/50* (2013.01); *G06F 21/55* (2013.01);
(Continued)

(58) Field of Classification Search
CPC .. G06F 21/00; G06F 21/50; G06F 21/55–554; H04L 63/10; H04L 63/102; H04L 63/14; H04L 63/1408–1433
See application file for complete search history.

(56) References Cited

U.S. PATENT DOCUMENTS 7,690,037 B1* 3/2010 Hartmann ............. G06F 21/552
726/22
9,106,687 B1* 8/2015 Sawhney ............ H04L 63/1416
(Continued)

OTHER PUBLICATIONS

Mihael Ankerst et al., "OPTICS: Ordering Points to Identify the Clustering Structure," 1999, pp. 49-60, SIGMOD 99, Philadelphia, Pennsylvania, ACM.
(Continued)

*Primary Examiner* — Daniel B Potratz
*Assistant Examiner* — D'Arcy Winston Straub
(74) *Attorney, Agent, or Firm* — Nicholson De Vos Webster & Elliott LLP

(57) ABSTRACT

Techniques for detecting suspicious file access requests indicative of potential insider threats are described. A suspicious access detection module (SADM) determines, based on access data describing a access requests issued on behalf of multiple users, groups of the users having similar patterns of accesses to folders, a set of the folders accessed by each of the user groups, and ones of the user groups that are to be considered nearby others of the user groups based on having a threshold amount of folder access similarities. The SADM causes an alert to be generated responsive to a determination that a subsequent access request is suspicious because it accesses a file of a folder that is not within the set of accessed folders of the issuing user's user group, and because the folder is not within the sets of accessed folders of any nearby user groups.

24 Claims, 14 Drawing Sheets

(51) Int. Cl.
*H04L 29/06* (2006.01)
*H04L 29/08* (2006.01)
*H04W 4/08* (2009.01)

(52) U.S. Cl.
CPC .......... *H04L 63/0281* (2013.01); *H04L 63/10* (2013.01); *H04L 63/14* (2013.01); *H04L 63/1425* (2013.01); *H04L 67/22* (2013.01); *H04W 4/08* (2013.01); *H04L 67/02* (2013.01)

(56) References Cited

U.S. PATENT DOCUMENTS

| | | | | |
|---|---|---|---|---|
| 9,166,933 | B2* | 10/2015 | Liu | H04L 63/1425 |
| 9,674,201 | B1* | 6/2017 | Margel | H04L 63/0209 |
| 10,425,435 | B1* | 9/2019 | Kayyoor | H04L 63/104 |
| | | | | 726/28 |
| 2017/0353477 | A1* | 12/2017 | Faigon | G06N 7/005 |

OTHER PUBLICATIONS

Martin Ester et al., "A Density-Based Algorithm for Discovering Clusters in Large Spatial Databases with Noise," 1996, 6 pages, Proceedings of 2nd International Conference on Knowledge Discovery and Data Mining (KDD-96).

R. Fielding et al., "Hypertext Transfer Protocol—HTTP/1.1," Jun. 1999, 144 pages, Network Working Group, Request for Comments: 2616, The Internet Society.

Shtar G., et al., "Today's File Security is So '80s, Part 1: Why the Traditional Approach to File Security is Broken," Imperva, Data Security, Research & Reports, Jun. 5, 2017, downloaded from: https://www.imperva.com/blog/why-the-traditional-approach-to-file-security-is-broken/ on Jan. 11, 2019, 3 pages.

Shtar G., et al., "Today's File Security is So '80s, Part 2: Detect Suspicious File Access with Dynamic Peer Groups," Imperva, Data Security, Research & Reports, Jun. 12, 2017, downloaded from: https://www.imperva.com/blog/detect-suspicious-file-access-with-dynamic-peer-groups/ on Jan. 11, 2019, 5 pages.

* cited by examiner

1100

DETERMINE, BASED ON A FIRST ACCESS DATA DESCRIBING A PLURALITY OF ACCESS REQUESTS THAT IDENTIFY DIFFERENT ONES OF A PLURALITY OF DATA OBJECTS, THE FOLLOWING: 1105

> A MAPPING OF THE PLURALITY OF USERS TO THE PLURALITY OF RESOURCE GROUPS, WHEREIN THE MAPPING IDENTIFIES, FOR EACH OF THE PLURALITY OF USERS, THOSE OF THE PLURALITY OF RESOURCE GROUPS TO WHICH BELONG THE PLURALITY OF DATA OBJECTS IDENTIFIED BY THOSE OF THE PLURALITY OF ACCESS REQUESTS ISSUED ON BEHALF OF THAT USER 1110A
>
> A PLURALITY OF USER GROUPS AND RESPECTIVE SETS OF ONE OR MORE RESOURCE GROUPS OF THE PLURALITY OF RESOURCE GROUPS BASED ON THE MAPPING, WHEREIN THE PLURALITY OF USERS ARE GROUPED INTO THE PLURALITY OF USER GROUPS ACCORDING TO SIMILARITIES BETWEEN WHICH ONES OF THE PLURALITY OF RESOURCE GROUPS WERE ACCESSED ON BEHALF OF WHICH ONES OF THE PLURALITY OF USERS VIA THE PLURALITY OF ACCESS REQUESTS, WHEREIN EACH OF THE RESPECTIVE SETS OF RESOURCE GROUPS INCLUDES THOSE OF THE PLURALITY OF RESOURCE GROUPS TO WHICH BELONG THOSE OF THE PLURALITY OF DATA OBJECTS IDENTIFIED BY THOSE OF THE PLURALITY OF ACCESS REQUESTS ISSUED ON BEHALF OF THOSE OF THE PLURALITY OF USERS OF THE RESPECTIVE USER GROUP 1110B
>
> FOR EACH OF THE PLURALITY OF USER GROUPS, A SET OF NEARBY USER GROUPS OF THE PLURALITY OF USER GROUPS THAT ARE CONSIDERED NEARBY THAT USER GROUP BASED AT LEAST IN PART ON A LEVEL OF COMMONALITY BETWEEN THE PLURALITY OF RESOURCE GROUPS WITHIN THE RESPECTIVE SETS OF RESOURCE GROUPS, WHEREIN THE SET OF NEARBY USER GROUPS FOR A FIRST USER GROUP OF THE PLURALITY OF USER GROUPS IS NON-EMPTY 1110C

↓

DETERMINE THAT A FIRST ACCESS REQUEST DESCRIBED BY A SECOND ACCESS DATA IS SUSPICIOUS, WHEREIN THE FIRST ACCESS REQUEST IDENTIFIES A FIRST DATA OBJECT OF THE PLURALITY OF DATA OBJECTS INCLUDED IN A FIRST RESOURCE GROUP OF THE PLURALITY OF RESOURCE GROUPS, WHEREIN THE FIRST ACCESS REQUEST WAS ISSUED BY A FIRST ELECTRONIC DEVICE OF THE PLURALITY OF ELECTRONIC DEVICES RESPONSIVE TO USE BY A FIRST USER OF THE PLURALITY OF USERS DETERMINED TO BE IN THE FIRST USER GROUP, WHEREIN THE DETERMINING INCLUDES DETERMINING THAT THE FIRST RESOURCE GROUP IS NOT WITHIN THE RESPECTIVE SETS OF RESOURCE GROUPS OF THE FIRST USER GROUP AND THE SET OF NEARBY USER GROUPS OF THE FIRST USER GROUP 1115

↓

CAUSE AN ALERT TO BE GENERATED RESPONSIVE TO THE FIRST ACCESS REQUEST BEING DETERMINED TO BE SUSPICIOUS 1120

*FIG. 11*

INSIDER THREAT DETECTION UTILIZING USER GROUP DATA OBJECT ACCESS ANALYSIS

CROSS-REFERENCE TO RELATED APPLICATIONS

This application claims the benefit of U.S. Provisional Application No. 62/534,057, filed Jul. 18, 2017, which is hereby incorporated by reference.

FIELD

Embodiments relate to the field of computer networking; and more specifically, to techniques for detecting insider threats through the identification of suspicious access requests using user group data object access analysis.

BACKGROUND

In recent years, organizations such as large global business enterprises, governmental agencies, political organizations, and even small companies have suffered from data breaches as the world fundamentally relies more and more upon computer systems. Data breaches typically result in the loss and/or disclosure of sensitive, confidential data such as financial, strategic, and/or personal information. Such confidential information could, if it fell into the wrong hands, have significant repercussions for the organization and people associated with the organization.

Data breaches can be persistent over an amount of time, or occur only at a point in time. For example, an insider may perform a data breach by acquiring small amounts of sensitive information over a relatively long amount of time—e.g., days, weeks, months, or even years. Alternatively, data breaches may occur over a comparatively brief amount of time, such as when an attacker quickly acquires (e.g., downloads or copies) a large amount of information from the organization, which can range from fractions of a second to minutes or longer.

While many organizations are working to improve their computer and network security, much of the focus tends to be placed on preventing direct threats that come from outside an organization, while detecting threats from within the organization is often neglected. However, it appears that many significant data breaches have ultimately been an "inside job." Insiders—be they employees, contractors, business associates, or partners—may pose the biggest risk to enterprise data because they have trusted access to sensitive data, and may have inside information concerning the organization's security practices and computer systems.

Such "threats from within" can be categorized into three categories—threats due to malice, negligence, or compromise.

For example, malicious insiders are trusted insiders that intentionally steal data for their own purpose. Edward Snowden and Chelsea Manning are recent high-profile examples.

Edward Snowden, who was a United States (U.S.) National Security Agency (NSA) Contractor and System Administrator that acquired approximately four terabytes (TB) of data from the NSA using four laptop computers. Per the NSA, this data allegedly included approximately 1.7 million classified documents, and was the most damaging (known) data breach to ever impact the U.S. Intelligence Community.

Another example of a massive data breach by a malicious insider was from Chelsea Manning (born Bradley Manning), who worked as an intelligence analyst for the U.S. Army and acquired and disclosed approximately three-quarters of a million classified or unclassified but sensitive military and diplomatic documents via the WikiLeaks website.

One more example is the Anat Kamm-Uri Blau affair from 2007. In this breach, former Israeli soldier Anat Kamm, while working as an assistant in the Central Command bureau of the Israel Defense Forces (IDF), secretly copied thousands of classified and/or confidential documents and leaked this information to the Israeli Haaretz journalist Uri Blau.

Careless and negligent insiders are another type of insider threat. These are people within or directly associated with an organization that do not have malicious intent, yet they expose sensitive enterprise data due to careless behavior—usually by trying to cut corners or simplifying their daily chores.

Another type of insider threat relates to compromised insiders that allow "external" threats (e.g., cybercriminals or nation-states) to act with the same level of freedom as the trusted insider itself. This occurs because once an insider is compromised—usually via credential compromise or malware—it is in fact the insider that is directly accessing sensitive data. The Sony breach is a classic example of a breach resulting from insider compromise.

The Sony data breach, which was discovered in November 2014, likely had been ongoing for over a year. In this attack, the attackers claimed to have taken over 100 terabytes of data from Sony Pictures Entertainment. Sony later acknowledged that the hackers not only erased data from its systems, but also stole and subsequently released to the public pre-release movies, private communications, and sensitive documents such as salary schedules and social security numbers.

One common way that organizations have attempted to prevent these types of data breaches is to implement file access controls to enforce permissions for accessing files. Typically, such file access control enforcement schemes involve configuring rules that limit which files (or groups of files, storage locations, etc.) may or may not be accessed by specific users.

However, this approach of implementing and enforcing permissions for granting access to files has effectively been a failure. First, it is obvious that many large-scale data breaches continue to occur despite the existence and use of file access control systems. Moreover, as the numbers of users, files, and data in organizations continue to grow, it becomes exponentially more difficult for organizations to manage a "matrix" of user-to-file access permission configuration data. Further, implementing such file access controls can make collaboration between users within the organization very difficult, as the permissions for files may need to be modified very frequently to allow for the different types of permissible accesses by different users at different times.

BRIEF DESCRIPTION OF THE DRAWINGS

The invention may best be understood by referring to the following description and accompanying drawings that are used to illustrate embodiments of the invention. In the drawings:

FIGS. 4-7 illustrate operations for identifying suspicious data object requests according to some embodiments, in which:

FIG. 4 is a block diagram illustrating the identification of user groups based on resource group access histories according to some embodiments.

FIG. 5 is a block diagram illustrating the determination of distances between identified user groups according to some embodiments.

FIG. 6 is a block diagram illustrating the identification of a cutoff distance threshold value that can be used as part of a cutoff criterion and the determination of nearby user groups according to some embodiments.

FIG. 7 is a block diagram illustrating the identification of resource groups for one or more user groups according to some embodiments.

FIG. 11 is a flow diagram illustrating exemplary operations for detecting insider threats through the identification of suspicious data object access requests according to some embodiments.

DESCRIPTION OF EMBODIMENTS

Figure 1:
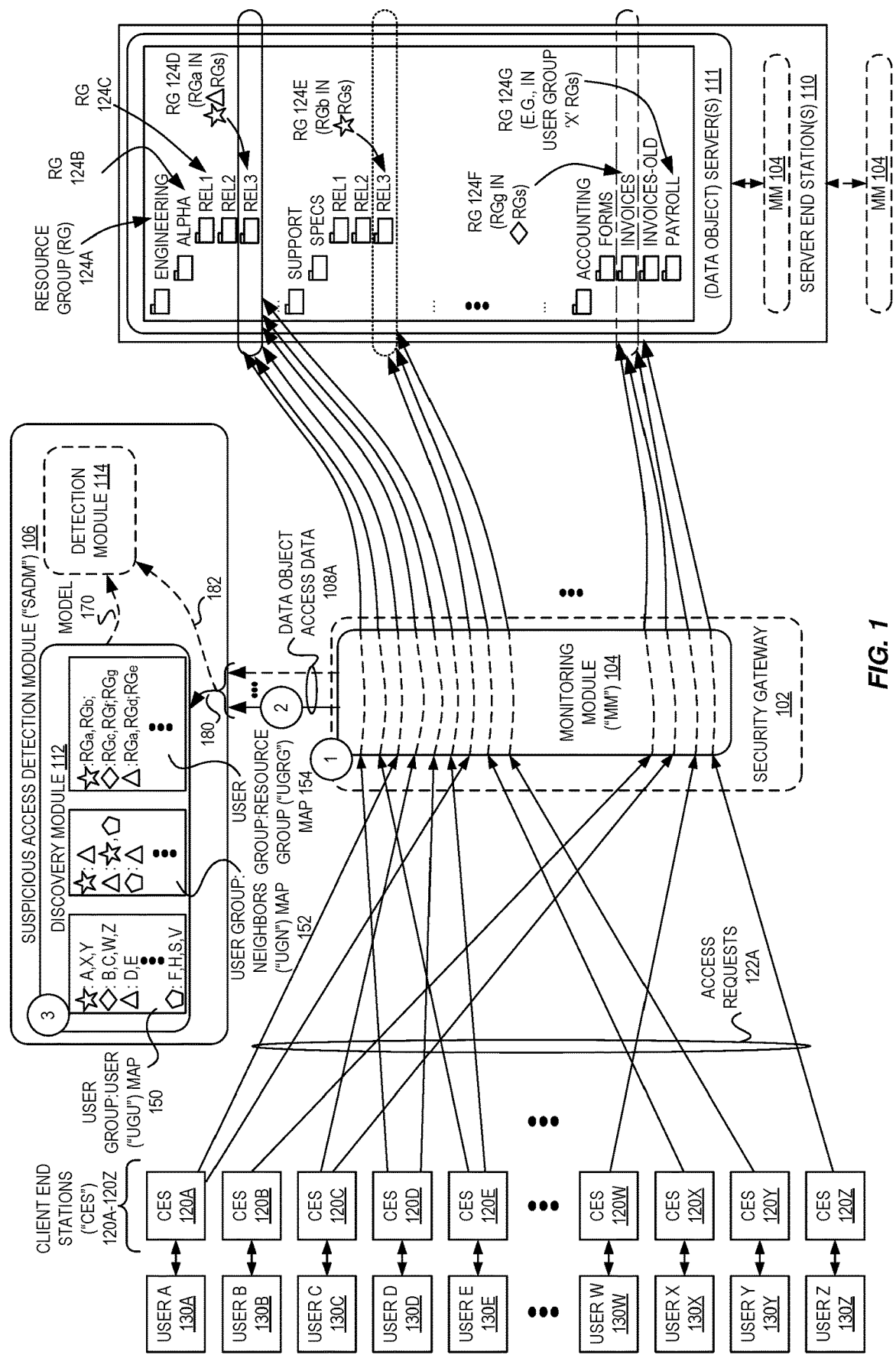
FIG. 1 is a block diagram illustrating a discovery phase of a technique for detecting insider threats according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Moreover, reference numerals with suffix letters (e.g., 120A-120Z, 130A-130Z, 124A-124G) may be used to indicate that there can be multiple instances of the referenced entity, though these multiple instances do not need to be identical but instead share some general traits or act in common ways. Further, the particular suffixes used are not meant to imply that a particular amount of the entity exists, unless specifically indicated to the contrary. For example, despite both client end stations 120A-120Z and users 130A-130Z using "A" to "Z" suffixes, in many embodiments there will not be 26 of each of these entities, and in many embodiments there can be different numbers of client end stations 120A-120Z and users 130A-130Z.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks; optical disks; random access memory (RAM); read only memory (ROM); flash memory devices; phase-change memory) and transitory computer-readable communication media (e.g., electrical, optical, acoustical or other form of propagated signals, such as carrier waves, infrared signals, digital signals). In addition, such electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media of a given electronic device typically stores code (i.e., instructions) for execution on the set of one or more processors of that electronic device. Of course, one or more parts of various embodiments may be implemented using different combinations of software, firmware, and/or hardware.

In the context of this description, the term "data object" is used to be inclusive of a variety of types of data or data structures, including but not limited to computer files. For example, a data object can be a file such as a word processing file, email message, text file, database file, document file, audio file, video file, audiovisual file, image file such as a raster image file or vector image file or page layout file, spreadsheet file, executable file, game file, font file, system file, settings file, compressed file, disk image file, source code file, backup file, etc. However, the term data object is also meant to include other types of data that may not be distinct files, such as a database field or fields (e.g., from a row, column, table, collection), a portion of memory, a virtual file, or other type of non-file object used by a particular application or applications.

Many data objects are stored using some type of durable storage (e.g., a "non-transitory computer readable storage medium") such as a hard drive, flash drive, optical drive, tape drive, etc. However, some data objects can also be generated dynamically and not exist as a single distinct unit on a non-volatile storage medium. For example, a data object can be a collection of data assembled by a computer program (e.g., a web application, a server), and may potentially include data from sources such as a database (e.g., one or more attribute values from one or more rows of data from one or more tables of a relational database), text file, etc. Such data objects can also potentially include several other data objects, i.e., be assembled from other data objects. In some embodiments, these types of assembled data objects could be, for example, a webpage that serves as part of a web application that is provided to users, such as a web page assembled using data stored in a database and/or code from the web application. Some of these assembled data objects may be transmitted to other devices as a file, and this file itself may or may not be persisted by the device that assembled the file. Accordingly, the term "data object" is to be broadly construed as covering a variety of types of data, where files are just one type of data object.

Additionally, as used in this description, the term "resource group" is meant to be inclusive of a variety of types of entities that can include, contain, organize, and/or collect data objects. For example, in many file systems, a resource group can be a folder or directory that can include file data objects. Similarly, in some computer applications (e.g., web applications, mobile applications), data objects may be collected in different groupings represented by names, icons/graphics, etc., and thus these representations can be "resource groups." Moreover, resource groups are also meant to include other types of entities, such as a row, column, table, collection, etc., in a database.

Embodiments described herein provide for methods, systems, non-transitory computer-readable storage media, and apparatuses for detecting insider threats through the identification of suspicious access requests using user group data object access analysis.

Embodiments identify and make use of data object access patterns to identify behavioral patterns and understand the normal day-to-day behavior of the users. A naive approach for modeling behavioral patterns within an organization would focus upon a single user—i.e., a user under examination—or on the organization as a whole. However, these approaches are incapable of performing well in security implementations. For example, it is not sufficient to focus upon specific user activity to detect suspicious behavior, as a resulting model would result in many false alarms because user activity can significantly change over time for legitimate reasons. Additionally, creating a behavioral pattern for a complete organization is similarly not useful as the activities of some users are substantially different than the activities of other users. To understand the legitimate behavior of users in an organization and identify suspicious behavior, a different context is required.

A key insight into this issue is that most users in an organization will have peers who work similarly to them with regard to the data objects of the organization. For example, often several employees may work on a same project and thus access similar data objects. Notably, employees could be from a same department or team may access the same types or collections of data objects. As another example, users from different departments/teams that have similar responsibilities, or work on a same interdepartmental project, may similarly access similar data objects. As yet another example, employees that are new to an organization may review a common set of "onboarding" or training materials, and thus these employees—whether of similar or dissimilar job function—may have similar data object access patterns. Thus, by considering similar users as a group, the behavioral patterns concluded are more correct and comprehensive.

Accordingly, in some embodiments, the users of an organization can be divided into number of groups (referred to herein as "user groups") based on each user of a group having a threshold amount of data object access activity. In some cases, the users in a given user group may be from the same department or team. However, in other cases, users from different departments or teams behave very similarly—e.g., employees from the "finance" and "legal" departments, employees from the "sales" and "marketing" departments, etc. Moreover, these user groups can be dynamic and vary over time: based on changes in the projects that the employees work on, changes in position, etc., the composition of the user groups can change to more accurately reflect actual behavior of the users. In some embodiments, each user group can include one or more users, and the user groups can be mutually exclusive so that no one user can exist in more than one user group.

In some embodiments, data object access data that represents access requests issued on behalf of users is analyzed to detect groupings of users having similar data object access patterns. For each user group, a set of resource groups is identified from the data object access data, where each set of resource groups identifies those resource groups that include those data objects accessed by the users of that user group. For each user group, zero, one, or more of the other user groups can be identified, based on the sets of resource groups associated with the user groups, as being "nearby" due to these user groups having a threshold amount of similarity between their corresponding sets of resource groups.

Based on the analysis, a model can be generated that can identify suspicious accesses. The model can be used to identify that a request for a data object, issued on behalf of a user, is suspicious when the resource group of the data object is not within the set of resource groups of that user's user group, and is not within the set(s) of resource groups of any nearby user groups to that user's user group. Accordingly, embodiments can flexibly and dynamically detect suspicious accesses made by a user involving a resource group that is not commonly accessed by other users in that user's user group (i.e., "similar" users), and that is not commonly accessed by other users in nearby user groups. As a result, insider threat detection can be implemented with a substantially reduced false positive rate compared to more naive approaches, while simultaneously maintaining a high true positive rate for identifying suspicious activity.

FIG. 1 is a block diagram illustrating a discovery phase of a technique for detecting insider threats according to some embodiments. FIG. 1 includes a monitoring module ("MM") 104 that is communicatively coupled between one or more client end stations 120A-120Z and one or more (data object) servers 111. In some embodiments, the MM 104 can be placed "inline" on a communications path between the client end stations 120A-120Z and the one or more servers 111 such that traffic passing between will flow through the MM 104. However, in other embodiments, the MM 104 need not be situated inline (i.e., directly within this communications path); some of these embodiments will be presented with further detail later herein with regard to FIGS. 13 and 14.

Each of the client end stations 120A-120Z can be a computing device operable to execute one or more applications seeking to communicate with the server(s) 111 implemented by one or more server end stations 110. There are a wide variety of types of client end stations 120A-120Z, including but not limited to workstations/Personal Computers (PCs), server computers, laptops, netbooks, mobile phones, smartphones, multimedia phones, smart watches and other wearable devices, Voice Over Internet Protocol (VOIP) phones, user equipment (UE), terminals, portable media players, Global Positioning System (GPS) units, gaming systems, set-top boxes, etc.

Each client end station 120A-120Z may or may not operate on behalf of one or more users 130A-130Z. For example, a client end station 120A can be assigned to a user 130A by an organization, in which case the client end station 120A may be a "managed" device that is subject to control (e.g., technological, contractual, etc.) by the organization. However, the client end stations 120A-120Z can also be "unmanaged" devices not subject to control of the organization—for example, client end station 120A could be a cellular phone or tablet privately owned by a user 130A.

Similarly, the server(s) 111 can be any of a variety of types of applications that can provide access to data objects, including but not limited to web servers (e.g., such as those implementing aspects of enterprise collaboration systems such as SharePoint by Microsoft™, Jive by Jive Software, Confluence by Atlassian, Basecamp by Basecamp (formerly 37 signals), etc.), file servers, databases, mail servers, application servers, etc. The client end stations 120A-120Z and server(s) 111 may seek to communicate using any of a variety of protocols, including but not limited to utilizing HyperText Transfer Protocol (HTTP), HTTP over TLS/SSL (HTTPS), Telnet, File Transfer Protocol (FTP)/FTP Secure (FTPS), Simple Mail Transfer Protocol (SMTP), Internet Message Access Protocol (IMAP), Post Office Protocol (POP), Simple Network Management Protocol (SNMP), Network File System (NFS), Server Message Block (SMB), Common Internet File System (CIFS), Apple Filing Protocol (AFP), Web Distributed Authoring and Versioning (WebDAV), etc.

The client end stations 120A-120Z may or may not operate within a same network as the data object server(s) 111. For example, in some embodiments one or more of the client end stations 120A-120Z may connect to the data object servers 111 over one or more public networks (e.g., the Internet), but in some embodiments the client end stations 120A-120Z can operate within a same private network (e.g., a Local Area Network (LAN)) as the data object servers 111 or remotely connect (e.g., via a Virtual Private Network (VPN) connection) to a same private network as the data object servers 111.

Regardless of their location, the client end stations 120A-120Z can transmit data object access requests 122A seeking access to one or more data objects stored and/or served by data object server(s) 111. For example, the users 130A-130Z may work for an organization and seek to access data objects (e.g., open a spreadsheet or word processing document) as part of their typical organizational duties. These access requests 122A arrive at the MM 104 at circle '1'.

As indicated above, the access requests 122A can include one or more of a variety of types of messages following one or more of a variety of protocols to attempt to access the data objects and/or resource groups of the server(s) 111. As used herein, an "access" to a data object or resource group loosely refers to a data object or resource group operation. The operation can be any one or more of multiple types of operations, including but not limited to a write, read, copy, move, delete, creation, query, download, etc., of one or more data objects and/or resource groups.

Based on these access requests 122A, the MM 104 can provide data object access data 108A (e.g., raw traffic/captures of packets, "event" data structures that represent certain traffic, etc.) to a suspicious access detection module ("SADM") 106 at circle '2'. For example, in some embodiments the data object access data 108A is generated based upon the requests and/or via supplementation from other data sources (by the MM 104, or later by the discovery module 112) and can include, for each data object access request, one or more of: a date and/or time of the request, a username or user identifier of the user having caused the request to be issued, a department of the user (e.g., acquired from an Lightweight Directory Access Protocol (LDAP) server), a domain of the user, a source Internet Protocol (IP) address of the request, a destination IP address of the request, a path of the requested data object (e.g., a file system path), a data object name, a data object extension (e.g., a file extension), a requested access operation (e.g., create, delete), a protocol identifier of the request, etc. The SADM 106 may receive such data object access data 108A from one MM 104 or multiple MMs 104.

This data object access data 108A is accessed at line 180 by a discovery module 112 of the SADM 106. The discovery module 112 may analyze the data object access data 108A to generate a user group to user map 150, a user group to neighbors map 152, and a user group to resource group map 154. These maps can thus be used to generate a model 170 that can be used, by a detection module 114, to identify suspicious accesses from data object access data provided via arrow 182. Further detail describing the generation of the maps, the generation of the model 170, and the subsequent use by the detection module 114 is provided later with reference to the other figures.

The user group to user—or "UGU"—map 150 defines one or more user groups, where each user group includes one or more users having a threshold amount of data object access similarity reflected in the data object access data 108A. This definition can occur based on analyzing the data object accesses of the users to the resource groups (e.g., folders of a file share) that include the accessed data objects.

In the illustrated example of a portion of a UGU map 150, the UGU map 150 shows a first user group (represented with a star) including user A 130A, user X 130X, and user Y 130Y. As shown in FIG. 1, these three users all accessed data objects within a common resource group 124E—a folder named "REL3". The illustrated UGU map 150 also shows a second user group (represented with a diamond) including user B 130B, user C 130C, user W 130W, and user Z 130Z. As shown in FIG. 1, these four users all accessed data objects within a common resource group 124F—a folder named "INVOICES". Similarly, other user groups are also shown as having been detected, including a third user group (triangle) with user D and user E (having accessed a same resource group 124D), and a user group (pentagon) with users F, H, S, and V (having accessed some one or more similar resource groups—not illustrated).

The user group to neighbors—or "UGN"—map 152 defines which of the user groups are considered to be "nearby" other user groups. This UGN map 152 can be generated based at least in part upon the user group to resource group—or "UGRG"—map 154.

The UGRG map 154 defines which of the resource groups are associated with each of the user groups. For a particular user group, the UGRG map 154 can identify some or all of the resource groups that were identified as being accessed by the users of that user group. As shown, the partial UGRG map 154 includes a "star" user group having identifiers of two resource groups in the UGRG map 154—"RGa" and "RGb"—which can correspond to resource group 124D and resource group 124E, respectively. Similarly, the "diamond" user group is shown as being associated with three resource groups in the UGRG map 154—"RGc" and "RGf" and "RGg"—which can correspond to two non-illustrated resource groups (RGc and RGf) and resource group 124F (RGg).

Using the UGRG map 154, the discovery module 112 can determine which of the user groups are "nearby" each other, which can be recorded in the UGN map 152. As shown, the partial UGN map 152 indicates that, for the "star" user group, the "diamond" user group has a sufficient amount of similar access history (e.g., a threshold amount of resource group overlap, as shown in the UGRG map 154) and thus these two user groups are "nearby" each other. The partial UGN map 152 also indicates that for the "triangle" user group, both the "star" user group and the "pentagon" user group are nearby, while for the "pentagon" user group, only the "triangle" user group is nearby.

As indicated above, the discovery module 112 can utilize this information of the maps to construct a model 170 that can be used by a detection module 114 of the SADM 106 to identify suspicious accesses.

Figure 2:
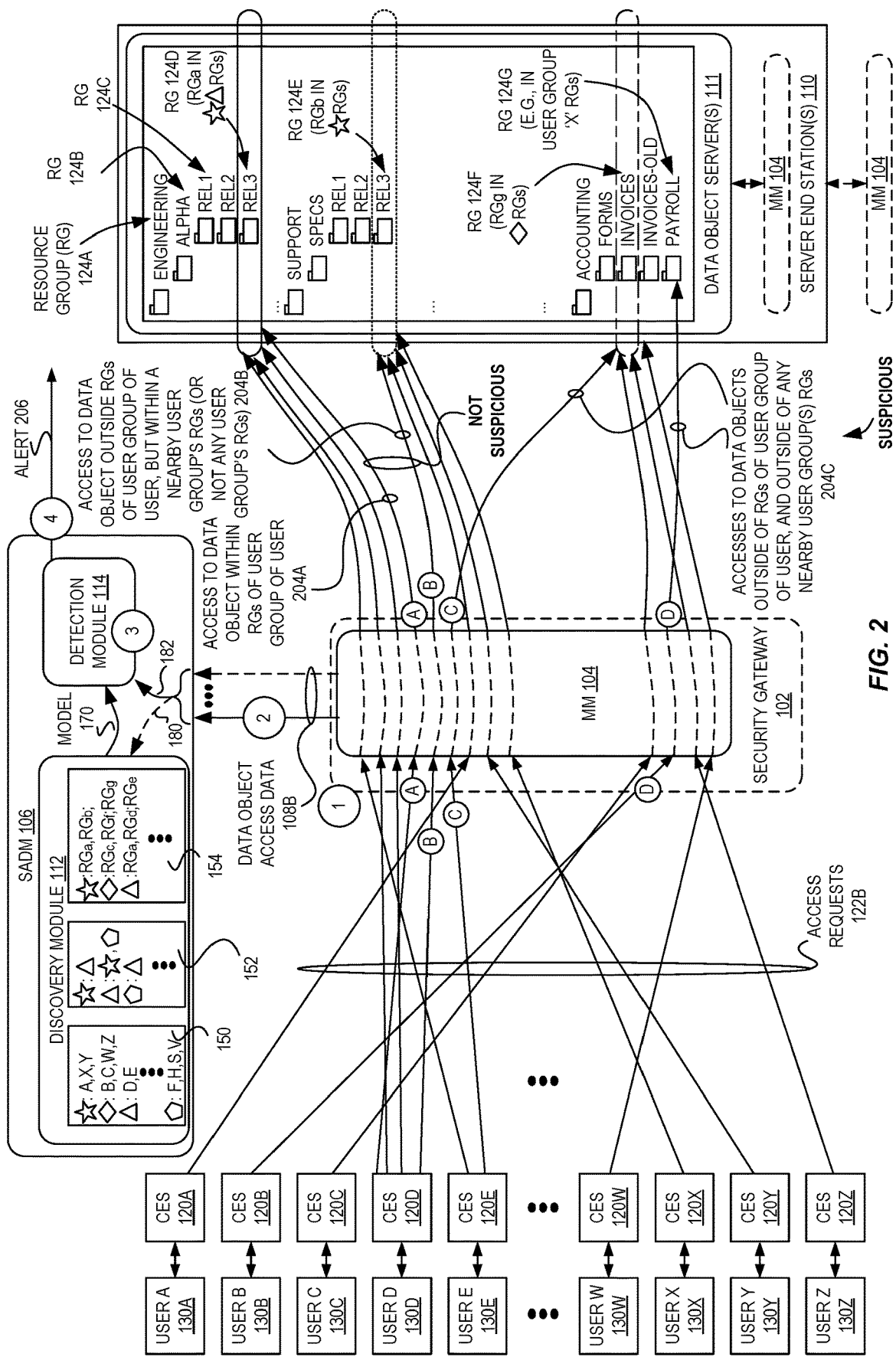
FIG. 2 is a block diagram illustrating a detection phase with optional continued discovery of a technique for detecting insider threats according to some embodiments.

FIG. 2 is a block diagram illustrating a detection phase with optional continued discovery of a technique for detecting insider threats according to some embodiments. As indicated above, upon the generation of a model 170, the detection module 114 can detect suspicious accesses within data object access data 108B that may be indicative of an insider threat.

For example, it is possible that some of the client end stations 120 include one (or possibly multiple) malware modules that cause the client end stations 120 to participate in one (or more) botnets. In some cases, a client end station (e.g., 120A) could be infected with malware while its user (e.g., owner/operator) is unaware of the infection. Thus, the user may continue to operate their client end station in a non-malicious manner, and the client end station may act as part of a botnet (e.g., receive commands from a controller, begin transmitting malicious traffic, etc.) and perform malicious actions without the user's knowledge, perhaps even concurrently while the user is actively utilizing the client end station. Alternatively or additionally, a user may be using one or more client end stations 120 to "snoop" through the enterprise's data for malicious or non-malicious purposes. Additionally, some of these access requests 122B may be part of a large-scale data breach, where a user attempts to access a large number of data objects over time for improper purposes, such as providing information to a competitor of the organization, leaking sensitive information, exploiting sensitive organizational data, etc. Embodiments disclosed herein can identify these types of anomalous data objects accesses as being suspicious.

As the organization continues its operations, its users 130A-130Z will continue accessing data objects via access requests 122B issued by client end stations 120A-120Z at circle '1'. The MM 104 can provide data object access data 108B to the SADM 106, which can provide this data object access data 108B via arrow 182 to the detection module 114, and optionally can provide this data object access data 108B via line 180 to discovery module 112 to allow for continual refinement/discovery using additional data points. However, using the model 170, at circle '3' the detection module 114 can analyze the data object access data 108B to detect any suspicious data object accesses, if any should exist. When a suspicious data object access is determined to exist, the detection module 114 can cause an alert 206 to be generated at circle '4', which can cause one or more security related actions to be performed.

As shown in FIG. 2 at circle 'A', one of the access requests 122B (access request 204A) is issued by client end station D 120D on behalf of user D 130D, which seeks to access a data object within resource group 124D. In this case, the detection module 114 can determine that the data object access request 204A was issued on behalf of user D 130D, determine that user D 130D is a member of user group "triangle", and determine that the involved resource group 124D (identifier "RGa") exists within the resource groups associated with that user group "triangle" (see UGRG map 154, in which "RGa" is associated with user group triangle). Accordingly, because the data object sought to be accessed is included within a resource group ("RGa") that is associated with that user's user group ("triangle"), the request 204A can be determined to be not suspicious.

Similarly, another access request 204B is shown at circle 'B' as being issued by client end station D 120D on behalf of user D 130D, which seeks to access a data object within resource group 124E ("REL3"). In this case, the detection module 114 can determine that the data object access request 204B was issued on behalf of user D 130D, determine that user D 130D is a member of user group "triangle", and determine that even though the involved resource group 124E (identifier "RGb") does not exist within the resource groups associated with user group "triangle", the involved resource group 124E (identifier "RGb") does in fact exist within the resource groups associated with user group "star"—which is "nearby" the user group "triangle." Accordingly, because the data object sought to be accessed is included within a resource group ("RGb") that is associated with a "nearby" user group's ("star") resource groups, the request 204B can be determined to be not suspicious.

As indicated above, a request to access a resource group of a "nearby" user group—but not of one's own user group—is not particularly suspicious because the categorization of these user groups as being "nearby" each other is based upon the fact that these two groups are accessing similar resource group locations, and may have substantial overlap. It has been observed in many organizational environments certain teams may be working on common or related projects, and it is fairly common for members of these similar teams to help each other out, collaborate, etc. For example, if a two teams of software engineers are working on separate features of an application that may eventually need to inter-operate, it is possible that each team may separately work with their own data objects (e.g., source code, documentation) and then later, start to work with the other team's data objects. Thus, these types of accesses are not particularly suspicious and in fact, may be expected in many cases—however, more naive approaches might issue false positive alarms (e.g., block these accesses from happening, report these accesses to an administrator or manager, etc.).

In some cases, an access to a data object included within a resource group that is not associated with any other user group may similarly be treated as non-suspicious. For example, it is common in many environments for users to create a new folder to work on a new project—in this case, a new folder will not have been previously observed as being accessed by any users. Accordingly, the access 204B would instead have been to a resource group not associated with any user group (e.g., not included in the UGRG map 154), the access 204B can be treated as non-suspicious. (In some embodiments utilizing a continual or repeated discovery process, this access will be detected and "baked" into the model 170 by being associated with that user's user group.)

FIG. 2 also illustrates two access requests 204C for accesses to data objects that are outside of the resource groups of the user's user group, and outside of the resource groups of the nearby user groups of that user's user group. For example, circle 'C' shows an access request issued by client end station E 120E on behalf of user E 130E, which seeks to access a data object within resource group 124F ("INVOICES"). In this case, the detection module 114 can determine that this access request was issued on behalf of user E 130E, determine that user E 130E is a member of user group "triangle," and determine that the involved resource group 124F (identifier "RGg") does not exist within the resource groups associated with user group "triangle" and also does not exist within the resource groups of the nearby user groups "star" or "pentagon." Thus, because the resource group is not in resource groups of the triangle group, and is also not in the resource groups of the "nearby" user groups (star and pentagon), this access request is to be treated as suspicious, and an alert 206 can be generated.

Similarly, circle 'D' shows an access request issued by client end station 120B on behalf of user B 130B, which seeks to access a data object within resource group 124G ("PAYROLL"). In this case, the detection module 114 can determine that this access request was issued on behalf of user B 130B, determine that user B 130B is a member of user group "diamond," and determine that the involved resource group 124G does not exist within the resource groups associated with user group "diamond" and also does not exist within the resource groups of the nearby user groups (relevant portion of UGN map 152 not shown), although it does exist within the associated resource groups of some other user group "X". Thus, this access request is to be treated as suspicious, and an alert 206 can be generated. However, if resource group 124G "PAYROLL" were not associated with any user groups—i.e., not in a set of resource groups for any of the user groups—the access request may not be treated as suspicious.

Figure 3:
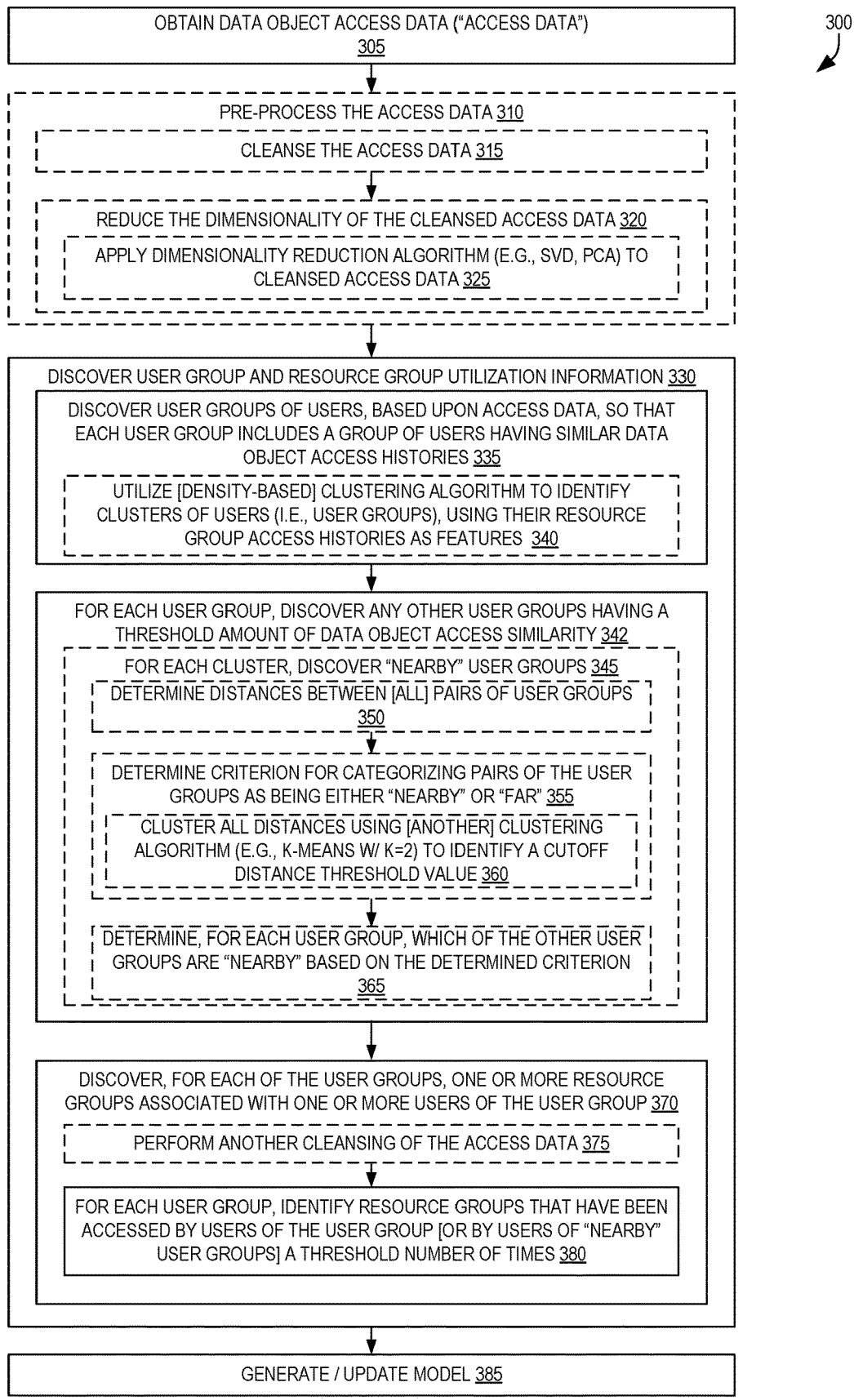
FIG. 3 is a flow diagram illustrating exemplary operations for generating a model that can be utilized for detecting insider threats according to some embodiments.

To understand some ways in which the discovery module 112 can generate the maps 150/152/154 and the model 170, we continue to FIG. 3, which is a flow diagram illustrating exemplary operations 300 for generating a model that can be utilized for detecting insider threats according to some embodiments. The operations 300 of FIG. 3 can be performed by, for example, the discovery module 112 of FIG. 1 or FIG. 2.

The operations 300 include, at block 305, obtaining data object access data, which can be provided by the MM 104 in complete form, or can be provided in partial form and supplemented or "enriched" (e.g., by the discovery module 112) to obtain additional information (e.g., identify the user associated with a request by performing a user-to-source IP address lookup, etc.). Such supplementation, using enterprise records, is well known to those of skill in the art and is not explained in depth to avoid obscuring other aspects.

Optionally, at block 310, the operations 300 include pre-processing the access data, which can include cleansing the access data at block 315 and/or reducing the dimensionality of the cleansed access data 320.

The cleansing the access data at block 315 can be performed to eliminate certain "noise" to thus improve the resulting model being generated. Block 315 can include, by way of example, one or more of the following: removing access data for failed accessed to data objects due to permission being denied, removing automated accesses to data objects (e.g., file accesses that were not initiated by a human user, but rather by a known automated process, such as accesses to operating system utilized files like a ".DS_Store" file or a "Thumbs.db" file, or files that are being accessed involuntary from user perspective), installation and/or execution files (e.g., .bat, .bin, .com, .cpl, .deb, .dll, .elf, .exe, .jar, .js, .lnk, .msi), commonly accessed resource groups (e.g., folders that are being accessed by a very large number of users—e.g., 75%—in the organization such that they become non-useful for this suspicious access detection), extremely rare resource groups (e.g., folders accessed by an extremely small number of users in the organization—e.g., 1 user, 2 users, or less than 1% of users), accesses made by "power" users of the organization (e.g., in many cases such power users—like administrators—will access large portions of the files in a file share for maintenance reasons), accesses made on behalf of "new" users to the organization (e.g., new users can be assigned a grace period—such as 28 days/4 weeks—in which their activity will not be profiled, as these users may browse often due to being unaware of what data objects they are looking for or where to find them, may access a variety of training materials from a variety of locations, may "rotate" through various teams/departments of organization to gain exposure to the breadth of the organization, etc.)

The cleansing at block 315 can further include removing accesses to resource groups that were only accessed by a single user, as such resource groups may not beneficially contribute to the protection mechanisms used by some embodiments. The cleansing at block 315 may further include removing all accesses made on behalf of a user who only made previously-cleansed access requests, as in some embodiments no user groups could be deduced for that user due to having no access requests to analyze.

In some embodiments, the output of this optional cleansing block 305 can be organized in a two-dimensional matrix, where each row of the matrix represents a user, and each column represents a resource group. The value in a particular row i and column j can be a value indicating whether (and/or to what degree) the user accessed that particular resource group. For example, the value could be the number of distinct days in which the user i accessed the resource group j in the profiling window, or could be another value (e.g., number of accesses per hour, per day, per week, in total, a mathematical function over one of these values).

The pre-processing of the access data at block 310 can also include, at block 320, reducing the dimensionality of the cleansed access data, which can include, at block 325 applying a dimensionality reduction algorithm (e.g., based on singular value decomposition (SVD), principal component analysis (PCA), etc.).

In some embodiments, block 325 can effectively "clean" a users-to-folders matrix from block 315, which includes normalizing each row of the matrix by the L2 norm of each row. Then, the dimensionality of the matrix is reduced—e.g., using the SVD technique. The result of decomposing matrix X using SVD can be 3 matrices: T, S, and D, where X=T*S*D'.

However, if only the k largest singular values of S are kept along with their corresponding columns in the T and D matrices, and the rest deleted—yielding matrices Sk, Tk, and Dk—the resulting matrix can be the unique matrix of rank k which is closest in the least squares sense to X:

$$\hat{X}=T^{k}*S^{k}*D^{k'}\approx X$$

In some embodiments, the dimensionality can be reduced to the first k singular values that explain 50% of the variance. Accordingly, the value of k can be chosen such that it will contain at least 50% of the variance (or a similar amount). This can be done by, for example, starting with only the first component (singular value), and adding additional square values of the components until at least 50% of the variance is explained. Thus the data strong trends (k trends) are kept while eliminating weak trends that might be noise. In some embodiments, the output of the process is the matrix $\hat{X}$, which is an approximation of the original matrix.

The operations 300 also include, in some embodiments, block 330, where user groups and resource group utilization information is discovered. Block 330 can include, at block 335, discovering user groups of users, based on the access data, such that each user group includes a group of users having similar data object access histories. Block 340 can include utilizing a density-based clustering algorithm to identify clusters of users (i.e., user groups), using their resource group access histories as features.

In some embodiments, the matrix $\hat{X}$ is the input to the clustering algorithm. There are many families of data clustering algorithms that can be used, and the algorithm discussed herein can be used in conjunction with different families of clustering algorithms. However, density-based clustering algorithms, such as DBSCAN ("Density-based spatial clustering of applications with noise", by Martin Ester, Hans-Peter Kriegel, Jörg Sander and Xiaowei Xu) or OPTICS ("Ordering points to identify the clustering structure" by Mihael Ankerst, Markus M. Breunig, Hans-Peter Kriegel and Jörg Sander), may be particularly well-suited for this application.

Density-based clustering, unlike centroid-based clustering (such as k-means), works by identifying "dense" clusters of points, allowing it to learn clusters of arbitrary shape and identify outliers in the data. Density-based classifies noise (instead of forcing it into a cluster), and it is not required to know the number of clusters (the k in k-means) ahead of time. These characteristics make density-based clustering algorithms quite useful in this context, especially due to the fact that the number of user groups to be discovered is not known beforehand.

For clarity of understanding, one approach using the OPTICS density-based clustering algorithm is described; however, other embodiments can use other density-based clustering algorithms (such as DBSCAN) or non-density-based clustering algorithms with somewhat similar results. Moreover, other embodiments can identify user groups using other types of algorithms; thus, this particular implementation is to be understood as one example. In an embodiment using OPTICS, two parameters in addition to the matrix are provided as inputs: (1) "minPts", which indicates the minimum number of points required to form a valid cluster (e.g., 2), and (2) "eps", which describes the maximum distance (or radius) to be considered (e.g., eps=maximum possible float value). The OPTICS algorithm may output, as a result, an ordered list of the input instances, and a reachability distance (RD) for each of the instances. The set of the RDs can include all relevant eps for the given dataset, and one can be selected. Using the ExtractDBSCAN-Clustering procedure described by the authors of OPTICS, the instance-to-cluster (i.e., user to user group) assignment can be determined for a given eps value.

For example, the distance measure for the clustering process can be the cosine distance. Using each of the values in RD and the OPTICS ExtractDBSCAN-Clustering procedure, a number of DBSCAN's clustering assignment is extracted. The clustering assignment that is selected is the one that maximizes:
harmonicMean(noiseScore,averageSilhouetteScore)
where:

$$noiseScore = \left(1 - \frac{numNoisePoints}{numPoints}\right)^2$$

and where numNoisePoints is the number of instances classified as noise, and numPoints is the number of instances clustered. The noise score is the number of non-noise instances divided by the total number of instances raised to the power of 2. Additionally, averageSilhouetteScore can be used as the average silhouette score over all instances ignoring the noise instances, where a silhouette score for a single instance is defined as:

$$s(i) = \frac{b(i) - a(i)}{\max\{a(i), b(i)\}}$$

Where a(i) is the average distance of instance i from instances in its cluster, and b(i) is the average distance of instance i from all the instances in other clusters. In some embodiments, a negative silhouette score can result for very poor quality results, and thus can be set to zero. The function harmonicMean is the harmonic mean of the values:

$$H = \frac{n}{\frac{1}{x_1} + \frac{1}{x_2} + \ldots + \frac{1}{x_n}} = \frac{n}{\sum_{i=1}^{n} \frac{1}{x_i}} = \left(\frac{\sum_{i=1}^{n} x_i^{-1}}{n}\right)^{-1}$$

Block 330 also includes, at block 342, discovering any other user groups, for each user group, that have a threshold amount of data object access similarity. In some embodiments, block 342 includes block 345 and discovering, for each cluster, any other user groups that are "nearby."

Block 345 can include, for example, determining distances between all pairs of user groups (block 350). There are many ways to determine a distance between two user groups (or clusters). One example technique involves determining a distance between two clusters using a single link via the following formula:

$$D(X, Y) = \min_{x \in X, y \in Y} d(x, y),$$

where X and Y are the respective sets of users taking part in each cluster, the vector used to represent a user is the relevant row in $\hat{X}$. Accordingly, the distance between the two closest users, where each user is from different cluster, can represent the distance between the two clusters. However, other formulations for an inter-cluster distance can be used. For example, the distance value could be based on determining an average distance between users in the two clusters, determining a maximum distance existing between users in the two clusters, etc.

Block 345 also includes determining a criterion for categorizing pairs of the user groups as being either "nearby" or "not nearby" (or "far") at block 355. The criterion can be based on a determined cutoff distance threshold value. The cutoff distance threshold value can be determined, for example via block 360, which includes clustering all of the determined distances using a clustering algorithm (e.g., k-means clustering with a k value of 2) to identify the distance threshold value.

As one example, distances between all pairs of clusters can be calculated and fed into the k-means algorithm (or one of the many variants thereof) using k=2, indicating that the distances are to be clustered into two clusters. As a result, the k-means clustering algorithm will assign each distance into one of two groups. The group with the lower values is the "close" group, where each value indicates a pair of clusters that is to be considered "nearby" each other.

As a modification to this procedure, the output of the k-means clustering algorithm could include a cutoff distance threshold value—i.e., a numeric value that lies between the two clusters. This value can be used, for example, to form the criterion—e.g., if a user group pair has a determined distance value that is less than the cutoff distance threshold value, then this pair of user groups are defined as being "nearby" each other. Thus, at block 365 (i.e., determining, for each user group, which of the other user groups are "nearby" based on the determined criterion), the inter-user group distance values can be analyzed to determine which, if any, are less than the cutoff distance threshold value.

As yet another alternative, this procedure could be performed for each of the user groups. In some embodiments, the distances from a user group and all other user groups can be fed into the k-means algorithm, and as a result, the k-means clustering algorithm will assign each distance into one of two groups. The group with the lower values is the "nearby" group of user groups to the user group under consideration, and the other group is the "far" group (i.e., user groups with users that behave much differently from the users in the user group under consideration). In some cases, all of the involved distance values could be equal or extremely similar, and thus the clustering algorithm may assign all values to a single cluster. In this case, this single cluster will represent the "far" group, and thus the user group under consideration will not have any nearby clusters.

Block 330 can also include block 370 and discovering, for each of the user groups, one or more resource groups associated with one or more users of that user group.

In some embodiments, block 370 includes utilizing the sets of user groups and the original access data (i.e., not the pre-processed access data of block 310). Block 370 can include performing another cleansing of the access data at block 375. For example, this access data can be cleaned by removing some or all of the following: (a) failed accessed to data objects due to permission being denied, (b) automatic accesses to data objects (e.g., file accesses that were not initiated by a human user), (c) accesses made by a power user, and/or (d) accesses made by new users within a new user grace period. Accordingly, in some embodiments, accesses to "rare" resource groups may not be filtered out at this stage, whereas such accesses may be removed in block 310. This can be implemented because accesses to such "rare" resource groups should be associated with user groups (e.g., because it is helpful to report access to such resource groups), but such accesses do not help with the clustering process(es) described above for user group identification, as a "rare" access (e.g., an access to a personal folder of a user, only accessed by that user) will not help detect commonalities between user data object access patterns).

At block 380, for each user group, resource groups are identified that have been accessed by users of the user group a threshold number of times (e.g., 1, 2, etc.). For example, in some embodiments the cleansed data is analyzed to identify a list of all resource groups that were accessed, and each resource group can be associated with at least one, but perhaps many different user groups. Thus, a set of resource group identifiers can be constructed for each user group.

In some embodiments, block 380 also includes including, in each set of resource groups for each of the user groups, any resource groups that were accessed by users of any nearby user groups. For example, instead of a set of resource groups including only those resource groups that were accessed by users of that associated user group, a set of resource groups may be configured to include all resource groups that were accessed by users of that associated user group and also all resource groups that were accessed by any "nearby" user groups of that user group.

At block 385, the operations 300 include generating a model (or updating an existing model) based on the discovered user group and resource group utilization information from block 330. For example, a model can include—or be based on—the UGU map 150 (e.g., from block 335), the UGN map 152 (e.g., from block 370), and/or the UGRG map 154 (e.g., from block 370). The model can be arranged such that it allows for a quick look-up to determine, for a particular access request, whether the involved resource group is—or is not—included in a set of resource groups associated with the user's user group and/or in a set of resource groups associated with nearby user groups of the user's user group. Such a model can be implemented in a variety of ways using a variety of types of information, data structures, etc. For example, a model could be indexed according to a user identifier, in which an access results in an identification (e.g., via a pointer or other identifying element) of a set of non-suspicious resource groups that could be accessed by that user (e.g., all resource groups of that user's user group and nearby user groups). Thus, a use of the model (e.g., by using a user identifier associated with an access request, and a resource group identifier that includes the accessed data object) can reveal whether the accessed resource group exists within the relevant set of non-suspicious resource groups—and if not, then an alert can be generated due to the access request being deemed suspicious.

These depicted operations 300 involve analysis based on whether other users have or have not accessed particular resource groups (e.g., folders) that include data objects (e.g., files). However, in some embodiments, this analysis can be extended to consider other factors as well. For example, other factors that can be analyzed may include a time when the resource groups were accessed, particular sequences of resource groups accessed, volumes of resource groups that were accessed, etc. Thus, as the data being accessed (i.e., the data objects) is the true target of an insider attack, focusing upon this data—e.g., the resource group including that data object (and/or other factors described above)—drives toward the heart of the attack and is particularly expressive for detecting such attacks, especially when compared to more naive approaches that may focus upon particular end stations, timing information, etc.

For clarity of understanding, we now turn to a visual representation of some example operations of a particular embodiment in FIGS. 4-7, which illustrate operations for identifying suspicious data object requests according to some embodiments.

Figure 4:
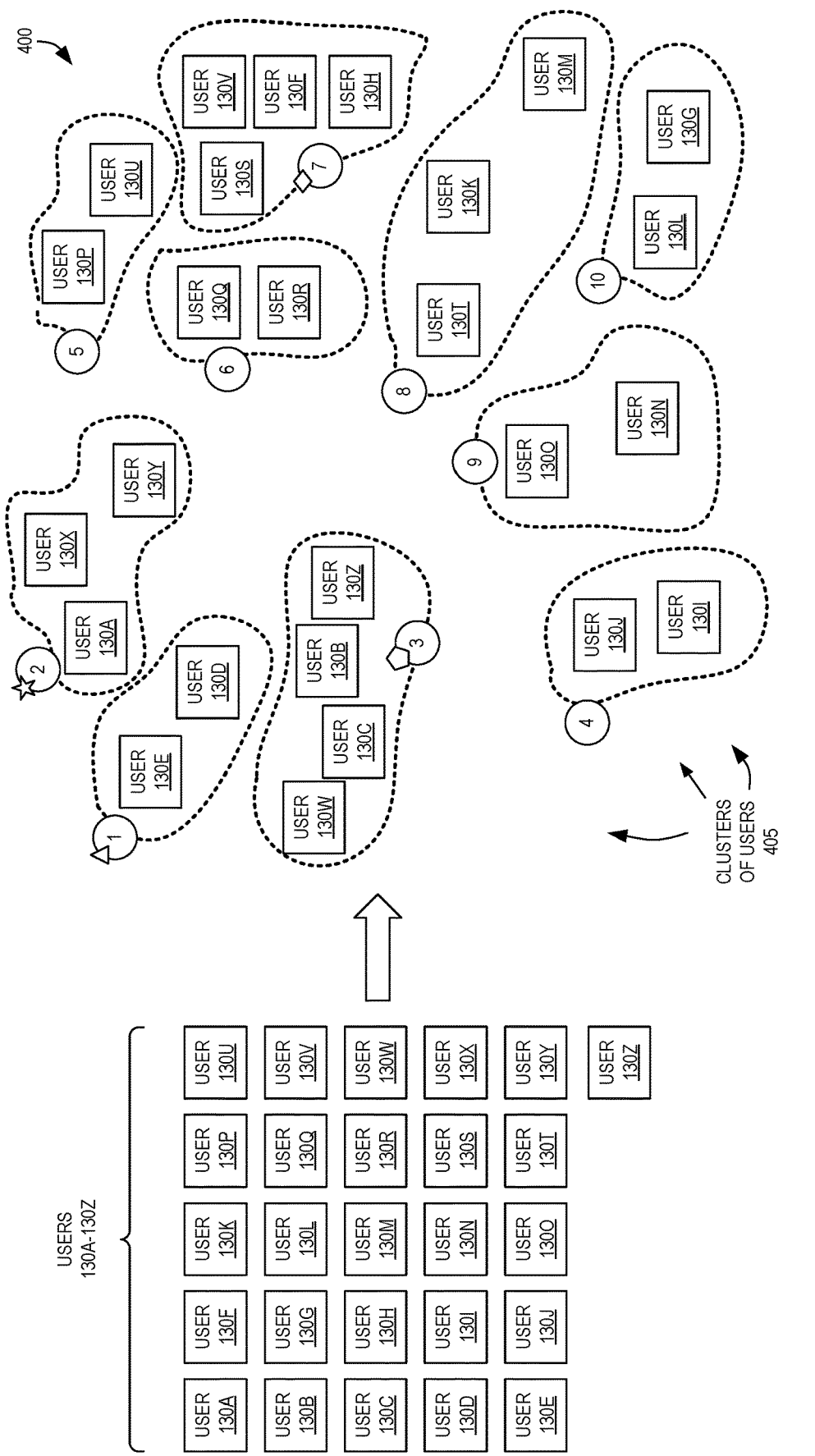

To begin, FIG. 4 is a block diagram 400 illustrating the identification of user groups based on resource group access histories according to some embodiments. The left side of the Figure illustrates a number of users 130A-130Z of an organization. These users 130A-130Z are shown in a large grouping to emphasize that embodiments need not rely upon pre-defined categorizations of users (e.g., an organization's organization chart, job titles/descriptions, etc.), and instead can detect groupings of users having similar data access patterns more organically.

In some cases, users of a same team or department might end up being placed in a same user group. For example, if a group of users in an engineering department all work on files (i.e., data objects) located in a particular folder (i.e., resource group) of a file share (i.e., server), it is possible that all of these users would have extremely similar data object access patterns, and thus end up in a same user group.

However, it has been observed in the real world that data object access patterns often can be quite different within teams, departments, etc., and that some users from one team/department might have similar access patterns to users from other teams/departments. As one example, in some settings a manager of a business team often may have a much more similar data object access pattern with other managers (of different business teams) than compared to other users within that manager's same team (e.g., engineers). As another example, it is often the case that users in a department may "team up" to work with users of another department for a project, and thus these users (during the pendency of the project) may have extremely similar data object access patterns, and these patterns may not be similar to the other users of their respective departments. Moreover, it is possible that users of different departments might have similar data object access patterns—e.g., users from a "sales" department and users from a "marketing" department. By analyzing data object access patterns (and/or the associated resource groups) instead of naively relying upon organizationally-defined groupings, embodiments can detect suspicious access patterns with a much higher precision by producing a more customized model. Further, embodiments utilizing continual (or periodic) discovery can adapt to the changes in such data object patterns over time to adjust to the natural changes of an organization.

Accordingly, embodiments can identify groupings of users (e.g., clusters of users 405), which can occur by utilizing a clustering algorithm to identify clusters of users using resource group access histories as features. As shown in FIG. 4, ten different user groups have been identified, where three of these groups (circles 1, 2, 3, and 7) correspond to the exemplary user groups of FIG. 1 and FIG. 2.

Figure 5:
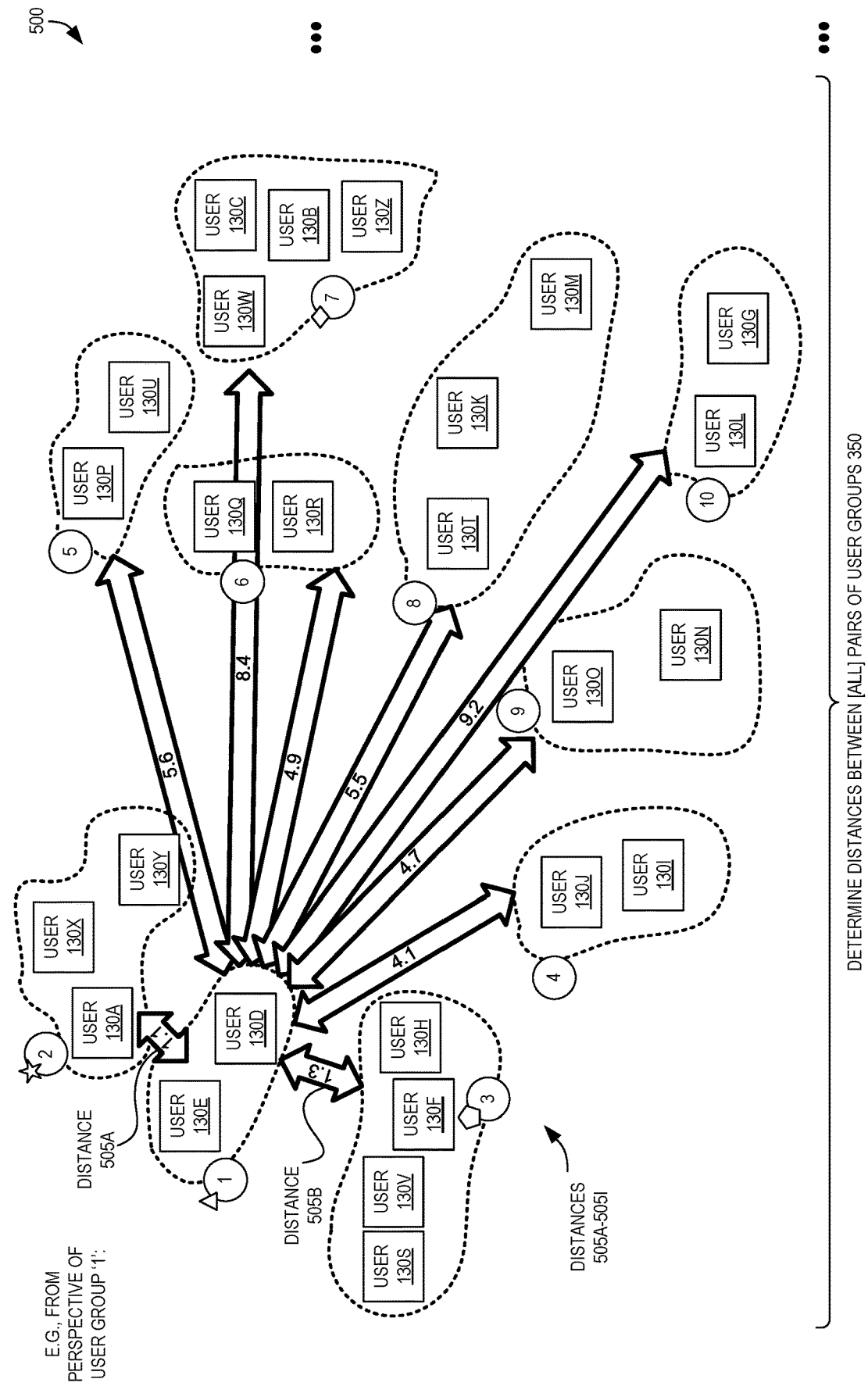

FIG. 5 is a block diagram 500 illustrating the determination of distances between the identified user groups of FIG. 4 according to some embodiments. This illustration shows the determination of distances 505A-I from the perspective of just one user group—here, user group '1'. However, in some embodiments, this determination can occur for all user groups, which might include separate iterations for each user group, or a different procedure that can determine all distances at once. In FIG. 5, the distance 505A between user group '1' and user group '2' is determined to be 1.1 units, the distance 505B between user group '1' and user group '3' is determined to be 1.3 units, the distance between user group '1' and user group '4' is determined to be 4.1 units, and so on.

Figure 6:
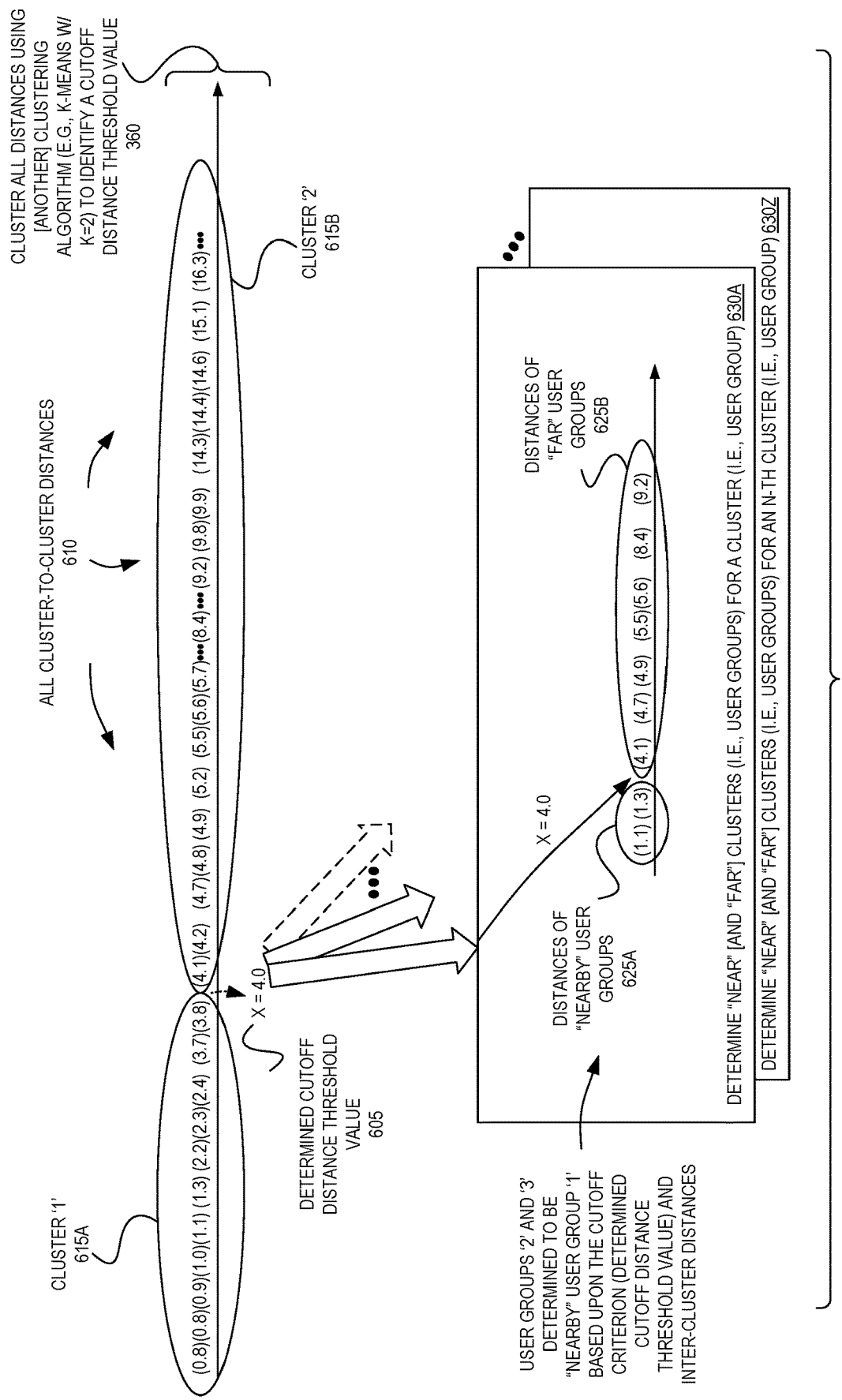

FIG. 6 is a block diagram illustrating the identification of a cutoff distance threshold value that can be used as part of a cutoff criterion and the determination of nearby user groups according to some embodiments. FIG. 6 depicts one example technique for clustering 360 all of the determined distances using another clustering algorithm (e.g., k-means with k=2) to identify a cutoff distance threshold value. As described above with regard to FIG. 3, there are multiple ways to ultimately determine 365, for each user group, which of the other user groups are "nearby" that user group. However, FIG. 6 depicts one technique where all of the distances 610 between all of the pairs of user groups are clustered at once into two clusters (cluster 1 615A and cluster 2 615B), which allows for a cutoff distance threshold value 605 to be identified. In this example, the cutoff distance threshold value 605 of X=4.0 indicates that inter-user group distances that are less than 4.0 will indicate "nearby" user groups, and all other pairs of user groups are not to be considered nearby.

For ease of understanding, this process is illustrated at the bottom of FIG. 6 with regard to determining 630A "near" (and "far") clusters for a cluster (i.e., near and far user groups from the perspective of a first user group). The determined cutoff distance threshold value 605 can be used to identify that for user group '1', both user group '2' (distance=1.1) and user group '3' (distance=1.3) are "nearby" user group '1' because their distances 625A are less than the cutoff distance threshold value 605 (and thus satisfy the cutoff criterion—"distance<cutoff distance threshold value"—to determine which other user groups are "nearby"), whereas the other user groups have distances 625B that exceed the cutoff distance threshold value 605 (and thus do not satisfy the cutoff criterion). Of course, this same determination can occur from the perspective of other user groups, and this block 630A can be conceptually repeated (i.e., 630A-630Z) though many embodiments implement different implementations that can use less intensive processing.

Figure 7:
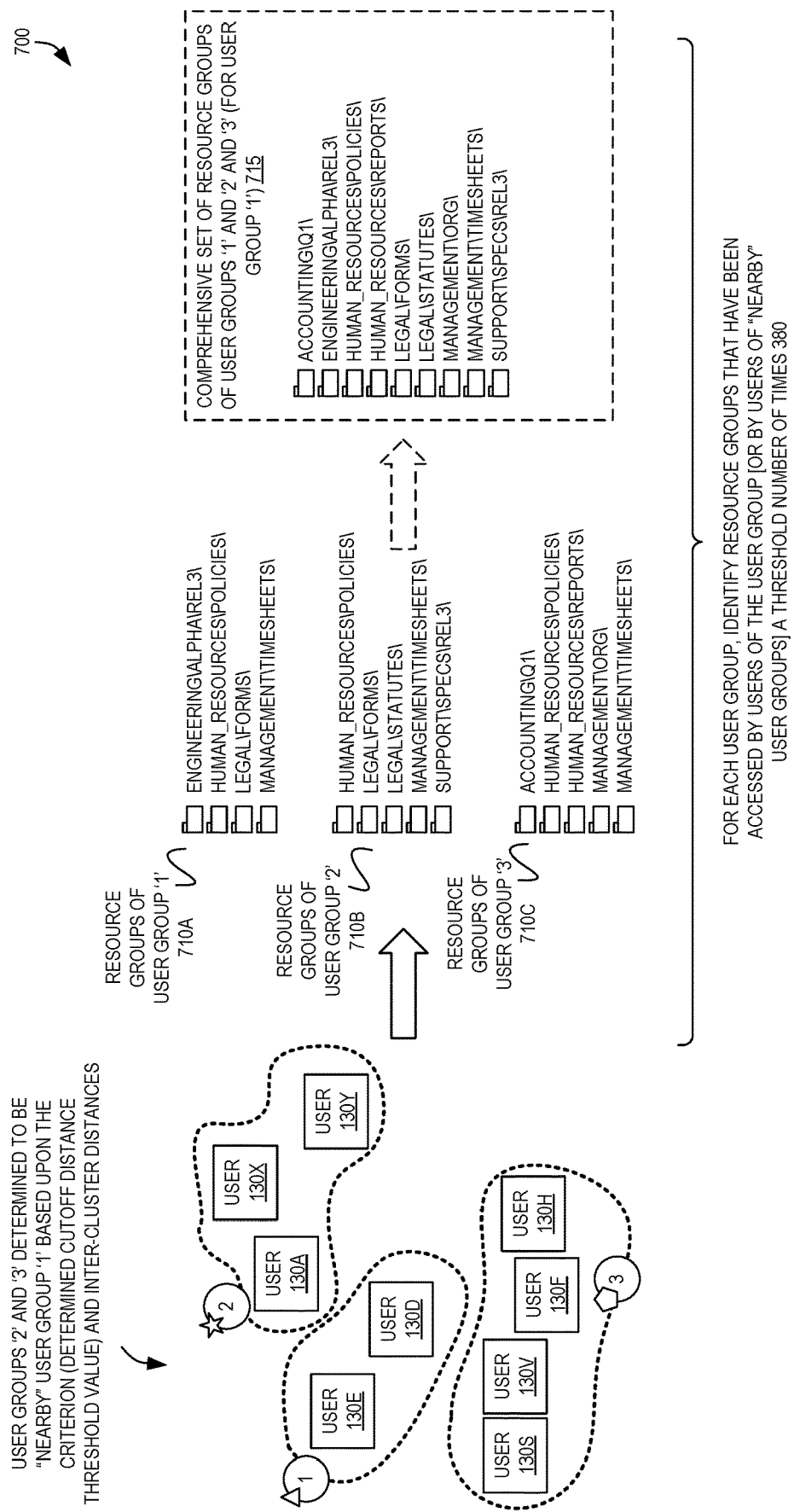

Continuing the example, FIG. 7 is a block diagram 700 illustrating the identification of resource groups for one or more user groups according to some embodiments. As indicated in FIG. 6, from the perspective of user group '1', both user group '2' and user group '3' are nearby. Thus, in some embodiments, for each user group, resource groups can be identified 380 that have been accessed by users of the user group (or by users of "nearby" user groups) a threshold number of times.

As illustrated, the users of user group '1' can be determined as having accessed four resource groups 710A, the users of user group '2' can be determined as having accessed five resource groups 710B (two of which overlap with the resource groups 710A of user group '1'), and the users of user group '3' can be determined as having accessed five resource groups 710C (two of which overlap with the resource groups 710A of user group '1').

In some embodiments, each of these sets of resource groups 710A-710C may be logically embedded as part of the model 170 utilized by the detection module 114 for detecting suspicious accesses. In this case, the detection module 114 may determine whether a resource group of an accessed data object is within the resource groups of the user's user group (e.g., user group '1') by performing a lookup in that set of resource groups 710A. If not, the detection module 114 may then need to perform lookups in the nearby user groups' resource groups (e.g., resource groups 710B and/or resource groups 710C) to determine whether the access request is suspicious.

In some embodiments, a comprehensive set of resource groups—e.g., resource groups 715—that includes a collection of all the resource groups 710A of the user group and the resource groups 710B/710C of nearby user groups. In this case, the detection module 114 can perform a single lookup into this comprehensive set of resource groups 715 upon determining the access request involves a user in user group '1' to determine whether the access request is suspicious.

Figure 8:
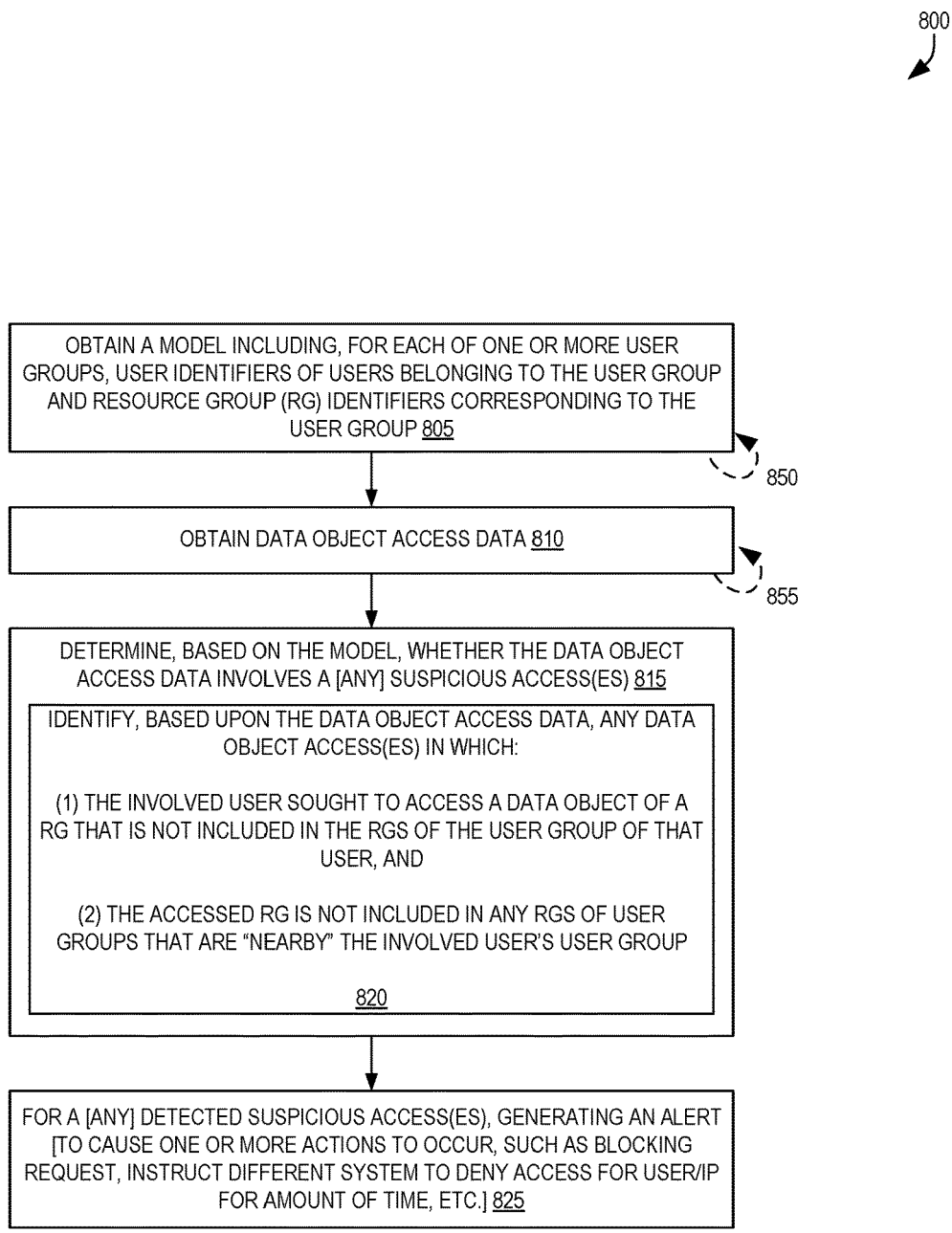
FIG. 8 is a flow diagram illustrating exemplary operations for detecting insider threats through the identification of suspicious access requests according to some embodiments.

We now turn to FIG. 8, is a flow diagram illustrating exemplary operations 800 for detecting insider threats through the identification of suspicious access requests according to some embodiments. The operations 800 of FIG. 8 can be performed, for example, by the detection module 114 of FIG. 1 or FIG. 2, or more generally by the SADM 106 of FIG. 1 or FIG. 2.

The operations 800 include, at block 805, obtaining a model including, for each of one or more user groups, user identifiers of users belonging to the user group and resource group identifiers corresponding to the user group. This block 805 can be repeatedly performed (as represented by dashed arrow 850), such as in embodiments where the model is improved over time based upon new data object access data.

At block 810, the operations 800 include obtaining a set of data object access data. This block 810 may also be performed one or many times, as indicated by dashed arrow 855.

At some point, the operations 800 include block 815 and determining, based on the model, whether the data object access data involves any suspicious accesses. For example, block 815 can be performed on a per-request basis (e.g., for every access request, a data object access data is obtained at block 810, and then block 815 is performed), or on a periodic basis (e.g., one time per hour, day, etc.). Block 815 can include, identifying, based upon the data object access data, any data object access(es) in which: (1) the involved user sought to access a data object of a resource group that is not included in the resource groups of the user group of that user, and (2) the accessed resource group is not included in any resource groups of user groups that are "nearby" the involved user's user group.

At block 825, the operations 800 include, for any detected suspicious accesses, generating an alert. The alert can cause one or more security-related actions to occur. For example, in an embodiment where the operations 800 are occurring inline (e.g., before the analyzed access request is provided to the server(s) 111), an action could include blocking the request, increasing an amount of scrutiny placed upon the request, etc. As another example, an action could include causing (e.g., sending a message, calling a function) another system to deny access for a particular user (e.g., the user associated with the access request) or network address (e.g., a source IP address used to issue the access request) for an amount of time, etc. As yet another example, an action could include making an Application Programming Interface (API) call to notify another system, sending a Short Message Service (SMS) message to a user/administrator, sending an email message or other type of electronic message, causing a user interface to be updated to indicate the detected suspicious access, etc.

Figure 9:
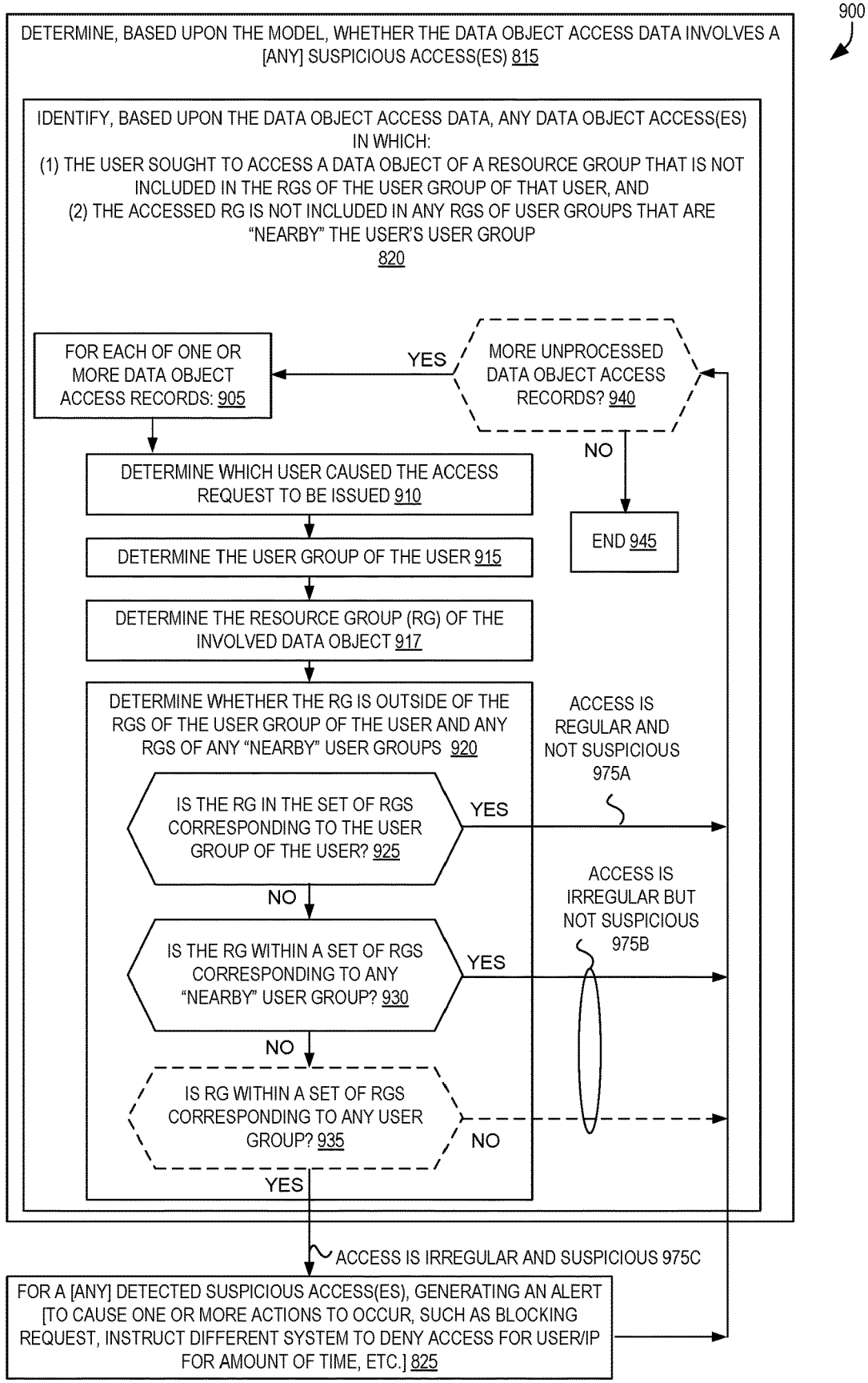
FIG. 9 is a flow diagram illustrating exemplary operations for determining whether data object access data involves any suspicious accesses according to some embodiments.

FIG. 9 is a flow diagram illustrating exemplary operations 900 that can be performed as part of blocks 815/820 of FIG. 8, for determining whether data object access data involves any suspicious accesses according to some embodiments. Block 905 may initiate the process for each of one or more data object access data records. At block 910, the operations 900 include determining which user caused the access request to be issued. Block 910 can be performed in a variety of ways, including but not limited to performing a lookup (e.g., using a source IP address of the request to determine a user utilizing that address), obtaining a user identifier within the request (or sent in another message before the request), etc.

At block 915, the operations 900 include determining the user group of the user. Block 915 can include using a user identifier of the user as an index to a UGU map 150 or similar data structure that is part of the model 170. At block 917, the operations 900 include determining the resource group of the involved data object. Block 917 can include, for example, identifying a resource group (e.g., folder) that includes the data object directly within the access request, performing a lookup using an identifier of the data object in a data object to resource group mapping that is maintained, etc.

At block 920, the operations 900 include determining whether the resource group is outside of the resource groups of the user group (of the user) and the resource groups of any "nearby" user groups (to the user's user group). Block 920 can include performing a search in one or more user group-specific resource groups (e.g., resource groups 710A/710B/710C) or a search in a comprehensive set of resource groups for the user group (e.g., comprehensive resource groups 715).

At block 925, when the resource group is determined to be in the set of resource groups associated with the user's user group, the access can be determined to be regular and non-suspicious at arrow 975A.

At block 930, when the resource group is determined to be in a set of resource groups associated with one of the nearby user groups (to the user's user group), the access can be determined to be irregular but non-suspicious as indicated by arrow 975B. Optionally, in some embodiments, if the resource group is not within a set of resource groups associated with one of the nearby user groups (to the user's user group) and also not within any user group's associated set of resource groups, the access request may also be determined to be irregular but non-suspicious as indicated by arrow 975B (due to the resource group not being known as being accessed/owned by others).

However, when the resource group is determined to not be in a set of resource groups associated with one of the nearby user groups (to the user's user group), and optionally determined to exist within some other ("far") user group's set of resource groups, the access can be determined to be irregular and suspicious at arrow 975C, and then the flow can continue to block 825, where an alert can be generated.

Depending upon the path of the operations, the flow may continue back to block 905, but may optionally include a decision block 940 where it is determined whether any more unprocessed data object access records exist. If not, the operations may terminate at block 945.

Figure 10:
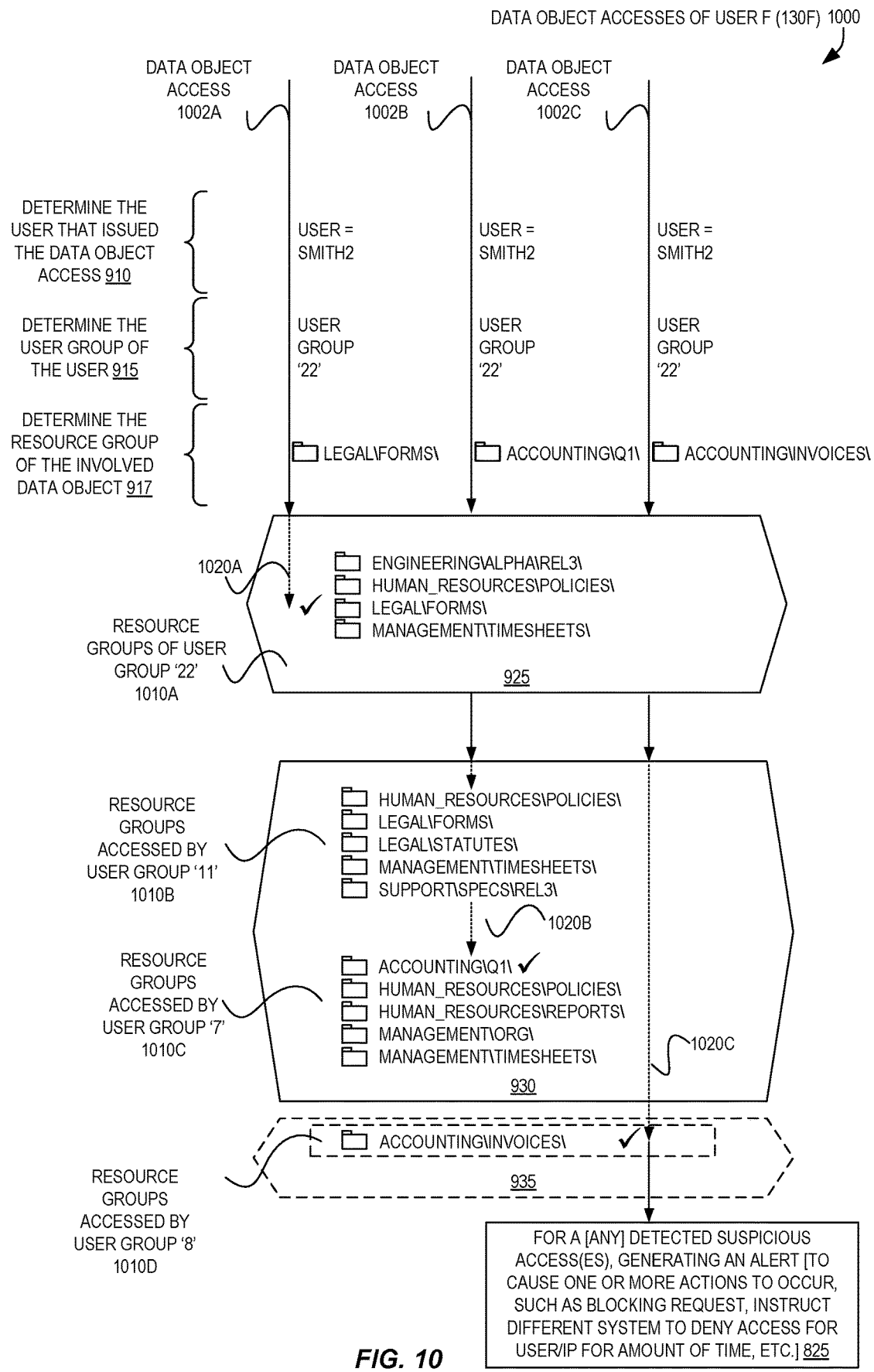
FIG. 10 is a diagram illustrating exemplary processing of three data object accesses according to techniques for insider threat detection according to some embodiments.

FIG. 10 is a diagram illustrating exemplary processing of three data object accesses 1000 using techniques for insider threat detection according to some embodiments. In FIG. 10, we assume that a same user—user F 130F—causes three different data object access requests 1002A-1002C to be issued. In each of the three access requests 1002A-1002C, the involved user can be determined to be the same—here, "SMITH2." Similarly, for each of the three access requests 1002A-1002C, the user group of the involved user can be determined to be the same—here, "group 22."

However, the involved resource groups of these three requests are different. The first data object access request 1002A seeks to access a data object within a resource group "FORMS", which at 1020A is determined to be included in the set of resource groups 1010A associated with the user group '22'. Thus, the data object access request can be determined to be non-suspicious, per block 925.

The second data object access request 1002B seeks to access a data object within a resource group "Q1", which is not in the resource groups 1010A of group '22' but which at 1020B is determined to be included in a set of resource groups 1010C associated with one of the "nearby" user groups of user group '22' (e.g., user group '7'). Thus, the data object access request can be determined to be non-suspicious, per block 930.

The third data object access request 1002C seeks to access a data object within a resource group "INVOICES". This resource group is not within the resource groups 1010A of the user's user group '22' (determined at block 925). Additionally, this resource group is not within the resource groups 1010B-1010C of the "nearby" user groups '11' or '7' (determined at block 930).

In some embodiments, at this point the data object access request 1002C can be determined to be suspicious, and thus block 825 can be performed. However, in some embodiments, block 935 must be checked to determine whether the involved resource group does in fact exist in some other (non-nearby) user group's set of resource groups. As shown, this resource group does appear in a set of resource groups 1010D of user group '8', which we stipulate is not nearby user group '22'. Thus, block 825 can be performed; however, if this resource group did not appear in any set of resource groups of any of the user groups, in some embodiments the access request may be treated as being non-suspicious, as it involves a data object of a resource group that is not known to be owned/controlled/used by other users, and thus would likely not involve the access/theft of any existing enterprise data.

We now turn to two flows of operations for detecting insider threats. FIG. 11 is a flow diagram illustrating exemplary operations 1100 for detecting insider threats through the identification of suspicious data object access requests according to some embodiments.

The operations 1100 include, at block 1105, determining, based on a first access data describing a plurality of access requests that identify different ones of a plurality of data objects, the following:

Block 1110A: a mapping of the plurality of users to the plurality of resource groups, wherein the mapping identifies, for each of the plurality of users, those of the plurality of resource groups to which belong the plurality of data objects identified by those of the plurality of access requests issued on behalf of that user;

Block 1110B: a plurality of user groups and respective sets of one or more resource groups of the plurality of resource groups based on the mapping, wherein the plurality of users are grouped into the plurality of user groups according to similarities between which ones of the plurality of resource groups were accessed on behalf of which ones of the plurality of users via the plurality of access requests, wherein each of the respective sets of resource groups includes those of the plurality of resource groups to which belong those of the plurality of data objects identified by those of the plurality of access requests issued on behalf of those of the plurality of users of the respective user group; and Block 1110C: for each of the plurality of user groups, a set of nearby user groups of the plurality of user groups that are considered nearby that user group based at least in part on a level of commonality between the plurality of resource groups within the respective sets of resource groups, wherein the set of nearby user groups for a first user group of the plurality of user groups is non-empty.

The operations 1100 also include, at block 1115, determining that a first access request described by a second access data is suspicious, wherein the first access request identifies a first data object of the plurality of data objects included in a first resource group of the plurality of resource groups, wherein the first access request was issued by a first electronic device of the plurality of electronic devices responsive to use by a first user of the plurality of users determined to be in the first user group, wherein the determining includes determining that the first resource group is not within the respective sets of resource groups of the first user group and the set of nearby user groups of the first user group.

The operations 1100 also include, at block 1120, causing an alert to be generated responsive to the first access request being determined to be suspicious.

The set of operations 1100 can also include additional, non-illustrated operations:

In some embodiments, the operations 1100 further include removing, from the first access data, data describing those of the plurality of access requests that identify those of the plurality of data objects that are included in a set of one or more resource groups of the plurality of resource groups, wherein the set of resource groups includes: those of the plurality of resource groups determined to have been accessed by more than a first threshold amount of users of the enterprise within a time period, or those of the plurality of resource groups determined to have been accessed by fewer than a second threshold amount of users of the enterprise within the time period.

In some embodiments, the operations 1100 further include one or more of: removing, from the first access data, data describing those of the plurality of access requests issued on behalf of an administrative user of the plurality of users; removing, from the first access data, data describing those of the plurality of access requests issued responsive to automated system processes as opposed to purposeful actions of the plurality of users; or removing, from the first access data, data describing those of the plurality of access requests that identify those of the plurality of data objects included in those of the plurality of resource groups that have been accessed by only one user of the plurality of users.

In some embodiments, the determining, for each of the plurality of user groups, which of the others of the plurality of user groups are considered nearby (e.g., as part of block 1110C) that user group comprises: calculating a distance value between each pair of the plurality of user groups to yield a plurality of distance values, wherein the calculating is based on identifying common resource groups existing in the respective sets of resource groups. In some embodiments, the operations 1100 further include determining, based on the calculated distance values, a cutoff criterion that can be used to identify nearby user groups. In some embodiments, the nearby user groups for the first user group include any of the others of the plurality of user groups in which the distance value between the first user group and the other user group satisfies the cutoff criterion.

In some embodiments, the determining that the first access request is suspicious (e.g., block 1115) is further based on determining that the first resource group is identified within one of the set of resource groups of a second user group of the plurality of user groups, wherein the second user group is not considered to be nearby the first user group.

In some embodiments, the determining the plurality of user groups (e.g., block 1110B) comprises: clustering the plurality of users into the plurality of user groups according to a second clustering process, wherein the second clustering process utilizes the plurality of resource groups as features.

In some embodiments, the alert causes one or more actions to be performed including one or more of: transmitting a message to an administrator of the enterprise; causing the first access request to be blocked from reaching an intended destination; or causing a security measure to be activated to deny additional access requests from being successfully serviced that are caused to be issued by the first user, issued from a first electronic device of the first user, or include a network address utilized by the first electronic device.

In some embodiments, the plurality of access requests includes one or more of: one or more Common Internet Data object System (CIFS) or Server Message Block (SMB) requests; or one or more HTTP requests.

In some embodiments, the operations 1100 further include receiving the first access data from a monitoring module that lies on a path of communication between a plurality of electronic devices and one or more servers that provide access to the plurality of data objects; or receiving the first access data from the one or more servers that provide access to the plurality of data objects or one or more server end stations that implement the one or more servers.

Figure 12:
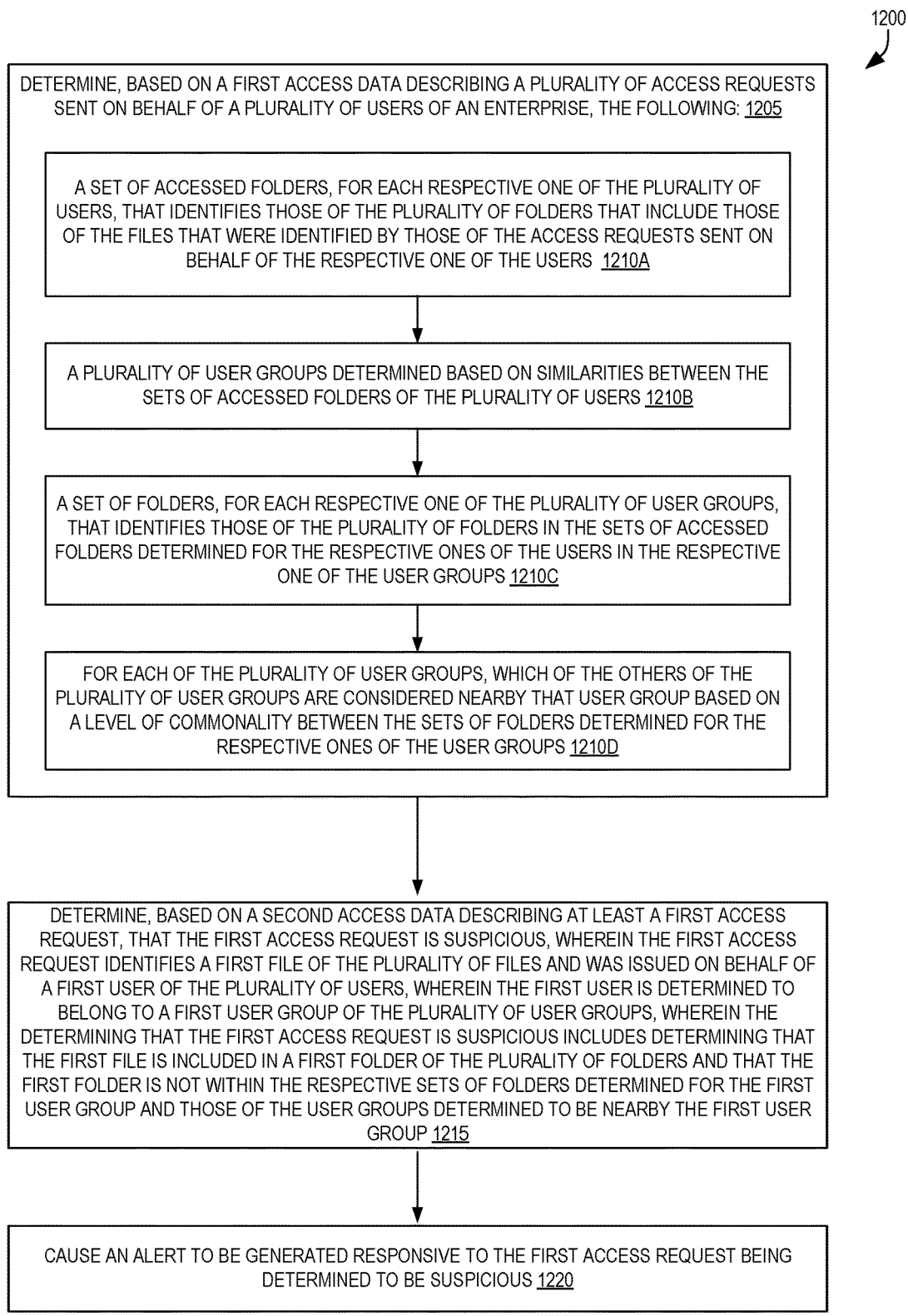
FIG. 12 is a flow diagram illustrating exemplary operations for detecting insider threats through the identification of suspicious file access requests according to some embodiments.

FIG. 12 is a flow diagram illustrating exemplary operations 1200 for detecting insider threats through the identification of suspicious file access requests according to some embodiments.

The operations 1200 include, at block 1205, determining, based on a first access data describing a plurality of access requests sent on behalf of a plurality of users of an enterprise, the following:

Block 1210A: a set of accessed folders, for each respective one of the plurality of users, that identifies those of the plurality of folders that include those of the files that were identified by those of the access requests sent on behalf of the respective one of the users;

Block 1210B: a plurality of user groups determined based on similarities between the sets of accessed folders of the plurality of users;

Block 1210C: a set of folders, for each respective one of the plurality of user groups, that identifies those of the plurality of folders in the sets of accessed folders determined for the respective ones of the users in the respective one of the user groups; and Block 1210D: for each of the plurality of user groups, which of the others of the plurality of user groups are considered nearby that user group based on a level of commonality between the sets of folders determined for the respective ones of the user groups.

The operations 1200 also include, at block 1215, determining, based on a second access data describing at least a first access request, that the first access request is suspicious, wherein the first access request identifies a first file of the plurality of files and was issued on behalf of a first user of the plurality of users, wherein the first user is determined to belong to a first user group of the plurality of user groups, wherein the determining that the first access request is suspicious includes determining that the first file is included in a first folder of the plurality of folders and that the first folder is not within the respective sets of folders determined for the first user group and those of the user groups determined to be nearby the first user group.

The operations 1200 also include, at block 1220, causing an alert to be generated responsive to the first access request being determined to be suspicious.

Exemplary Deployment Environments

As described herein, the various involved components can be deployed in various configurations for various purposes. For example, FIG. 13 is a block diagram illustrating an exemplary on-premise deployment environment 1300 for a SADM 106 according to some embodiments.

Figure 13:
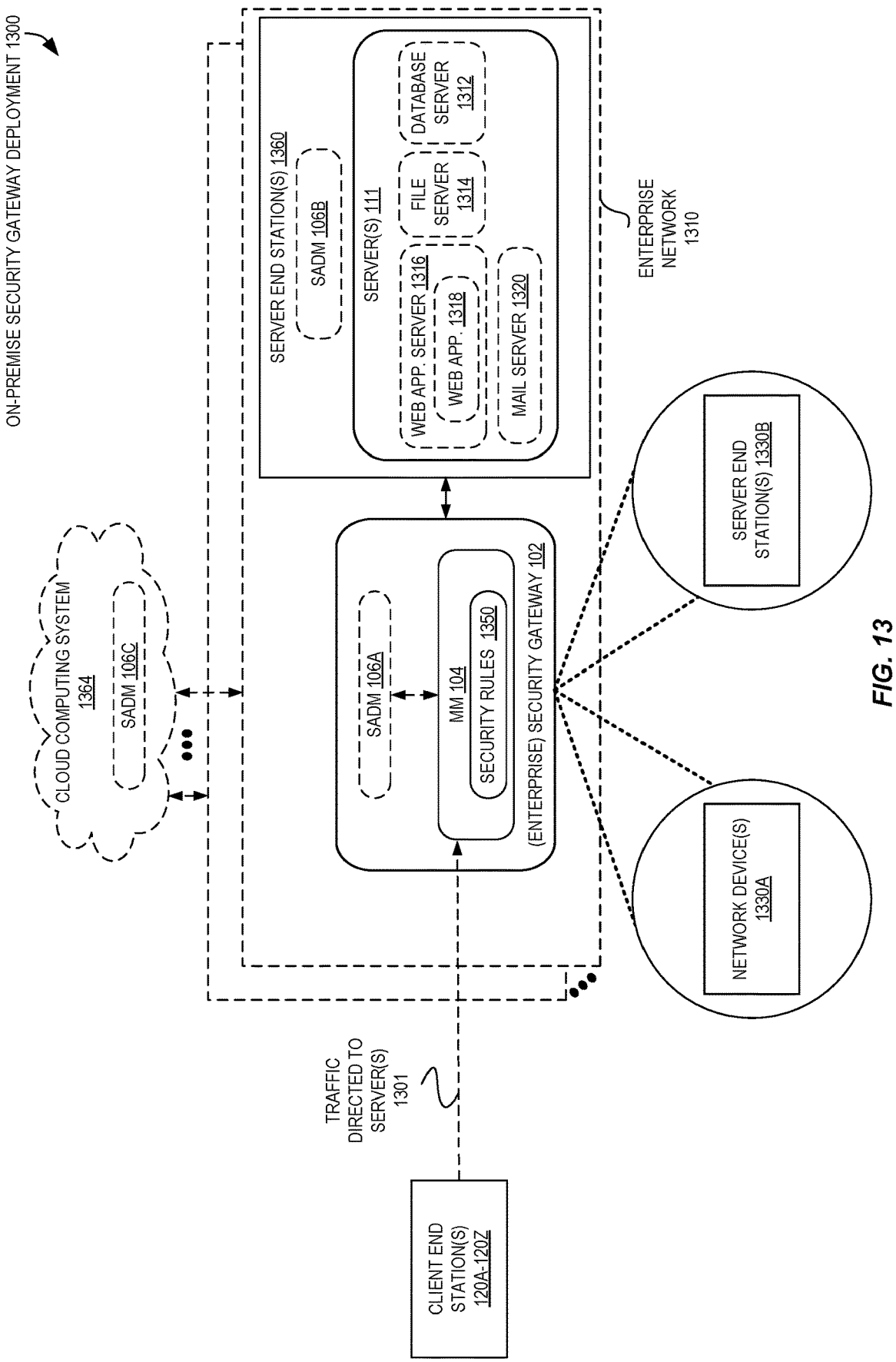
FIG. 13 is a block diagram illustrating an exemplary on-premise deployment environment for a suspicious access detection module according to some embodiments.

Specifically, FIG. 13 illustrates the SADM 106 implemented in a security gateway 102 (which can be an enterprise security gateway) coupled between the server(s) 111 and client end stations 120A-120Z. Thus, access to the server(s) 111 can be thought of as being "protected" by the security gateway 102, as most (or all) desired interactions with any of the server(s) 111 will flow through the security gateway 102.

Security gateways—such as firewalls, database firewalls, file system firewalls, and web application firewalls (WAFs)—are network security systems that protect software applications (e.g., web application servers 1316) executing on electronic devices (e.g., server end stations 1360) within a network (e.g., enterprise network 1310) by controlling the flow of network traffic passing through the security gateway. By analyzing packets flowing through the security gateway and determining whether those packets should be allowed to continue traveling through the network, the security gateway can prevent malicious traffic from reaching a protected server, modify the malicious traffic, and/or create an alert to trigger another responsive event or notify a user of the detection of the malicious traffic.

In some embodiments, the security gateway 102 is communicatively coupled between the client end stations (120A-120Z) and the server end stations 1360, such that all traffic (or a defined subset of traffic) destined to the server end stations 1360 is first passed through (or made available to) the security gateway 102 for analysis. In some embodiments, part of the analysis is performed by the SADM 106 based upon one or more configured security rules 1350.

In some embodiments, the security gateway 102 executes as part of a separate server end station 1330B or a (dedicated or shared) network device 1330A; but in other embodiments, the security gateway 102 (and/or SADM 106B) can operate as part of server end stations 1360 (for example, as a software module), or can be implemented using or another type of electronic device and can be software, hardware, or a combination of both.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

Security gateways can be deployed as transparent inline bridges, routers, or transparent proxies. A security gateway deployed as a transparent inline bridge, transparent router, or transparent proxy is placed inline between clients (the originating client end station of the traffic 1301) and servers (e.g., server(s) 111) and is "transparent" to both the clients and servers (the clients and the servers are not aware of the IP address of the security gateway, and thus the security gateway is not an apparent endpoint). Thus, packets sent between the clients and the servers will pass through the security gateway (e.g., arrive at the security gateway, be analyzed by the security gateway, and may be blocked or forwarded on to the server when the packets are deemed acceptable by the security gateway).

Additionally, security gateways can also be deployed as a reverse proxy or non-inline sniffer (which may be coupled to a switch or other network device forwarding network traffic between the client end stations (120A-120Z) and the server end stations 1360).

In this depicted embodiment, the security gateway 102 and the server end station(s) 1360 are illustrated as being within an enterprise network 1310, which can include one or more LANs. An enterprise is a business, organization, governmental body, or other collective body utilizing or providing content and/or services.

In FIG. 13, a set of one or more server end stations 1360 execute or otherwise implement one or more servers providing the content and/or services. In the embodiment depicted in this figure, the one or more server(s) 111 include a database server 1312, a file server 1314, a web application server 1316, and a mail server 1320, though in other embodiments the set of server end stations 1360 implement other types of servers, including but not limited to print servers, gaming servers, application servers, etc.

A web application server 1316 is system software (running on top of an operating system) executed by server hardware (e.g., server end stations 1360) upon which web applications (e.g., web application 1318) run. Web application servers 1316 may include a web server (e.g. Apache, Microsoft® Internet Information Server (IIS), nginx, lighttpd) that delivers web pages (or other content) upon the request of HTTP clients (i.e., software executing on an end station) using the HTTP protocol. Web application servers 1316 can also include an application server that executes procedures (i.e., programs, routines, scripts) of a web application 1318. Web application servers 1316 typically include web server connectors, computer programming language libraries, runtime libraries, database connectors, and/or the administration code needed to deploy, configure, manage, and connect these components. Web applications 1318 are computer software applications made up of one or more files including computer code that run "on top" of web application servers 1316 and are written in a language the web application server 1316 supports. Web applications 1318 are typically designed to interact with HTTP clients by dynamically generating HyperText Markup Language (HTML) and other content (e.g., JavaScript code, Javascript Object Notification (JSON) formatted data, etc.) responsive to HTTP request messages sent by those HTTP clients. HTTP clients (e.g., non-illustrated software of any of client end stations 120A-120Z) typically interact with web applications by transmitting HTTP request messages to web application servers 1316, which execute portions of web applications 1318 and return web application data in the form of HTTP response messages back to the HTTP clients, where the web application data can be rendered using a web browser. Thus, HTTP functions as a request-response protocol in a client-server computing model, where the web application servers 1316 typically act as the "server" and the HTTP clients typically act as the "client."

HTTP Resources are identified and located on a network by Uniform Resource Identifiers (URIs)—or, more specifically, Uniform Resource Locators (URLs)—using the HTTP or HTTP Secure (HTTPS) URI schemes. URLs are specific strings of characters that identify a particular reference available using the Internet. URLs typically contain a protocol identifier or scheme name (e.g. http/https/ftp), a colon, two slashes, and one or more of user credentials, server name, domain name, IP address, port, resource path, query string, and fragment identifier, which may be separated by periods and/or slashes. The original versions of HTTP—HTTP/0.9 and HTTP/1.0—were revised in Internet Engineering Task Force (IETF) Request for Comments (RFC) 2616 as HTTP/1.1, which is in common use today. A new version of the HTTP protocol, HTTP/2, is rapidly being adapted, is based upon the SPDY protocol, and improves how transmitted data is framed and transported between clients and servers, among other things.

Database servers 1312 are computer programs that provide database services to other computer programs or computers, typically adhering to the client-server model of communication. Many web applications 1318 utilize database servers 1312 (e.g., relational databases such as PostgreSQL, MySQL, and Oracle, and non-relational databases, also known as NoSQL databases, such as MongoDB, Riak, CouchDB, Apache Cassandra, and HBase) to store information received from HTTP clients and/or information to be displayed to HTTP clients. However, other non-web applications may also utilize database servers 1312, including but not limited to accounting software, other business software, or research software. Further, some applications allow for users to perform ad-hoc or defined queries (often using Structured Query Language (SQL)) using the database server 1312. Database servers 1312 typically store data using one or more databases, each including one or more tables (traditionally and formally referred to as "relations"), which are ledger-style (or spreadsheet-style) data structures including columns (often deemed "attributes", or "attribute names") and rows (often deemed "tuples") of data ("values" or "attribute values") adhering to any defined data types for each column. Thus, in some instances a database server 1312 can receive a SQL query from a client (directly from a client process or client end station using a database protocol, or indirectly via a web application server that a client is interacting with), execute the SQL query using data stored in the set of one or more database tables of one or more of the databases, and may potentially return a result (e.g., an indication of success, a value, one or more tuples, etc.).

A file server 1314 is system software (e.g., running on top of an operating system, or as part of an operating system itself) typically executed by one or more server end stations 1360 (each coupled to or including one or more storage devices) that allows applications or client end stations access to a file-system and/or files (e.g., enterprise data), typically allowing for the opening of files, reading of files, writing to files, and/or closing of files over a network. Further, while some file servers 1314 provide file-level access to storage, other file servers 1314 may provide block-level access to storage. File servers 1314 typically operate using any number of remote file-system access protocols, which allow client processes to access and/or manipulate remote files from across the Internet or within a same enterprise network (e.g., a corporate Intranet). Examples of remote file-system access protocols include, but are not limited to, Network File System (NFS), WebNFS, Server Message Block (SMB)/Common Internet File System (CIFS), File Transfer Protocol (FTP), Web Distributed Authoring and Versioning (WebDAV), Apple Filing Protocol (AFP), Remote File System (RFS), etc. Another type of remote-file system access protocol is provided by Microsoft Sharepoint™, which is a web application platform providing content management and document and file management.

A mail server 1320 (or messaging server, message transfer agent, mail relay, etc.) is system software (running on top of an operating system) executed by server hardware (e.g., server end stations 1360) that can transfer electronic messages (e.g., electronic mail) from one computing device to another using a client-server application architecture. Many mail servers 1320 may implement and utilize the Simple Mail Transfer Protocol (SMTP), and may utilize the Post Office Protocol (POP3) and/or the Internet Message Access Protocol (IMAP), although many proprietary systems also exist. Many mail servers 1320 also offer a web interface (e.g., as a web application 1318) for reading and sending email.

The illustrated exemplary deployment also illustrates a variety of configurations for implementing a SADM 106. A first deployment possibility (SADM 106A) is as a module of the security gateway 102. Another deployment possibility (SADM 106B) is as a module executed upon the server end station(s) 1360, while another deployment possibility (SADM 106C) is a module executed in a cloud computing system 1364. In some embodiments, the SADM 106 is communicatively coupled with the MM 104, and thus can be located in a variety of locations able to provide such connectivity.

Figure 14:
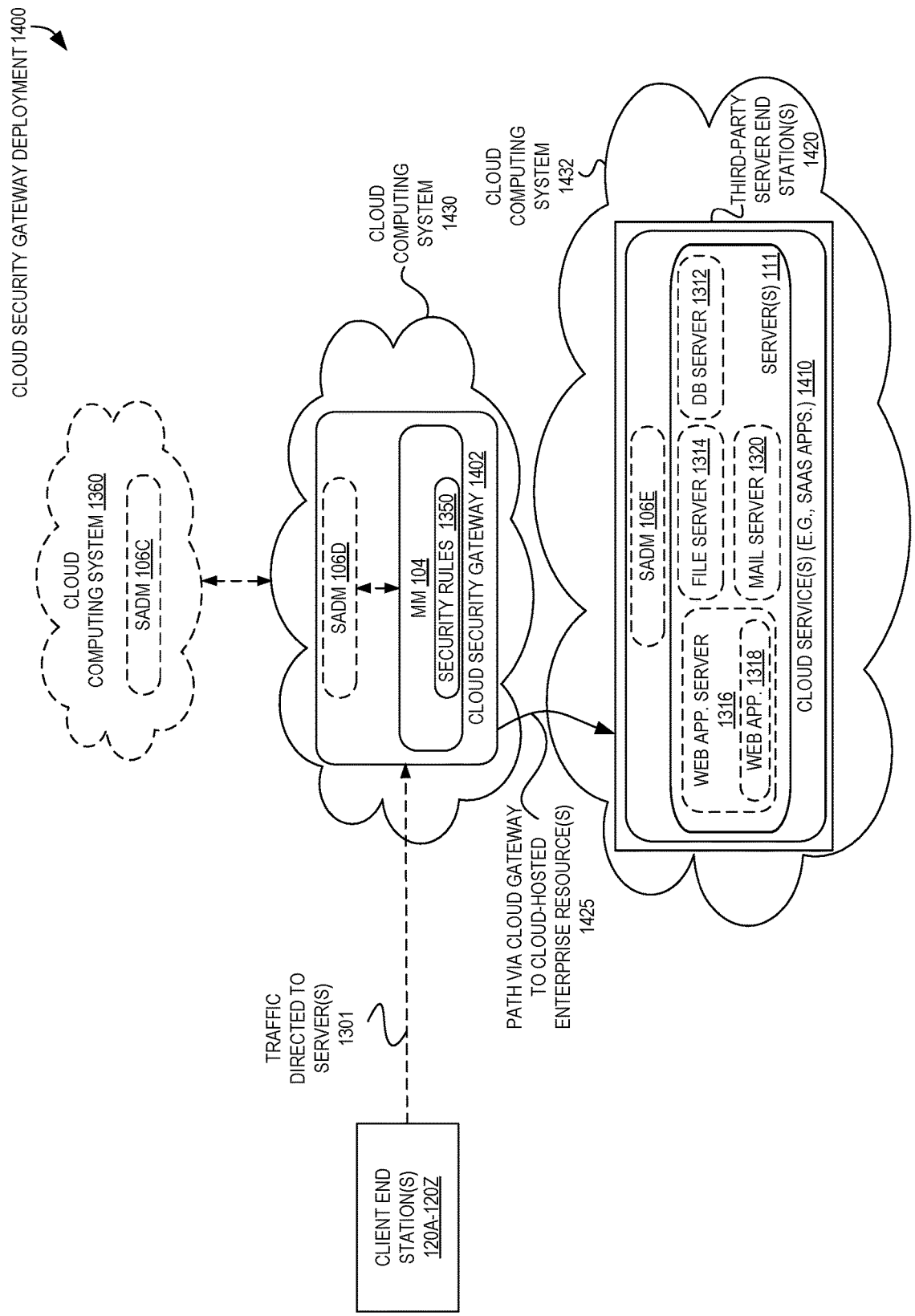
FIG. 14 is a block diagram illustrating an exemplary cloud-based deployment environment for a suspicious access detection module according to some embodiments.

Another deployment possibility is illustrated in FIG. 14, which is a block diagram illustrating an exemplary cloud-based deployment environment 1400 for a MM 104 and/or SADM 106 according to some embodiments.

FIG. 14 again illustrates server(s) 111, a MM 104, various deployments of a SADM 106, and client end station(s) 120A-120Z. However, in this depicted embodiment, the server(s) 111 (and possibly the SADM 106E) can be provided as cloud services 1410 of one or more third-party server end stations 1420 of, for example, a cloud computing system 1432.

Additionally, the MM 104 (and possibly SADM 106D) can be provided in a cloud security gateway 1402 operating in a cloud computing system 1430, which can be different than cloud computing system 1432 or possibly even the same. Regardless, the path 1425 from the client end station(s) 120A-120Z to the server(s) 111 necessarily flows through the MM 104, even though it may not be in a same cloud computing system 1432 as the server(s) 111.

Alternatively, though not illustrated, the MM 104 may not lie in the path 1425 between the client end stations 120A-120Z and the server(s) 111, and instead may gain access to network traffic through a channel between the MM 104 and the server(s) 111 for this purpose. For example, the MM 104 can be configured to "monitor" or "poll" the cloud service(s) 1410 by transmitting requests to the third-party server end stations (or individual servers, such as web application server 1316) as part of a monitoring scheme to obtain network traffic. This monitoring can occur according to a defined schedule, such as checking once every few minutes. Additionally or alternatively, the server(s) 111 can be configured to "report" some or all traffic (or summaries thereof, event data structures, etc.) to the MM 104. For example, in some embodiments the server(s) 111 can be configured to transmit data to the MM 104 using an API call, SMS message, email message, etc.

Alternative Embodiments

The operations in the flow diagrams have been described with reference to the exemplary embodiments of the other diagrams. However, it should be understood that the operations of the flow diagrams can be performed by embodiments other than those discussed with reference to these other diagrams, and the embodiments discussed with reference these other diagrams can perform operations different than those discussed with reference to the flow diagrams.

Similarly, while the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a suspicious access detection module implemented by one or more computing devices for detecting suspicious access requests from access requests that identify different ones of a plurality of files, wherein the plurality of files are organized within a plurality of folders, the method comprising:

determining, based on a first access data describing a plurality of access requests sent on behalf of a plurality of users of an enterprise, the following:
a set of user accessed folders, for each respective one of the plurality of users, that identifies those of the plurality of folders that include those of the files that were identified by those of the plurality of access requests sent on behalf of the respective one of the users,
a plurality of user groups determined based on similarities between the sets of user accessed folders of the plurality of users,
a set of group accessed folders, for each respective one of the plurality of user groups, that identifies those of the plurality of folders in the sets of user accessed folders determined for the respective ones of the users in the respective one of the user groups, and
for each of the plurality of user groups, which of the others of the plurality of user groups are considered nearby that user group based on a level of commonality between folders in the set of group accessed folders determined for that user group and the sets of group accessed folders determined for the respective ones of the others of the plurality of user groups;

determining, based on a second access data describing at least a first access request, that the first access request is suspicious, wherein the first access request identifies a first file of the plurality of files and was issued on behalf of a first user of the plurality of users, wherein the first user is determined to belong to a first user group of the plurality of user groups, wherein the determining that the first access request is suspicious includes determining that the first file is included in a first folder of the plurality of folders and that the first folder is not within the respective sets of group accessed folders determined for the first user group and those of the user groups determined to be nearby the first user group, wherein the first folder being within the set of group accessed folders determined for the first user group would be considered regular and non-suspicious and the first folder being within the sets of group accessed folders determined for user groups determined to be nearby the first user group would be considered irregular but not suspicious; and causing an alert to be generated responsive to the first access request being determined to be suspicious.

2. The method of claim 1, further comprising:

removing, from the first access data, data describing those of the plurality of access requests that identify those of the plurality of files that are included in a particular set of one or more folders of the plurality of folders, wherein the particular set of one or more folders includes:

those of the plurality of folders determined to have been accessed by more than a first threshold amount of users of the enterprise within a time period, or those of the plurality of folders determined to have been accessed by fewer than a second threshold amount of users of the enterprise within the time period.

3. The method of claim 1, further comprising one or more of:

removing, from the first access data, data describing those of the plurality of access requests issued on behalf of an administrative user of the plurality of users;

removing, from the first access data, data describing those of the plurality of access requests issued responsive to automated system processes as opposed to purposeful actions of the plurality of users; or removing, from the first access data, data describing those of the plurality of access requests that identify those of the plurality of files included in those of the plurality of folders that have been accessed by only one user of the plurality of users.

4. The method of claim 1, wherein said determining, for each of the plurality of user groups, which of the others of the plurality of user groups are considered nearby that user group comprises:

calculating a distance value between each pair of the plurality of user groups to yield a plurality of distance values, wherein the calculating is based on identifying common folders existing in the respective sets of group accessed folders.

5. The method of claim 4, wherein said determining, for each of the plurality of user groups, which of the others of the plurality of user groups are considered nearby that user group further comprises:

determining, based on the calculated distance values, a cutoff criterion that can be used to identify nearby user groups.

6. The method of claim 5, wherein the nearby user groups for the first user group include any of the others of the plurality of user groups in which the distance value between the first user group and the other user group satisfies the cutoff criterion.

7. The method of claim 5, wherein determining the cutoff criterion comprises:

clustering the plurality of determined distance values into at least two clusters using a first clustering process, wherein the cutoff criterion is based on an identified cutoff value separating a first cluster and a second cluster of the at least two clusters, and wherein the cutoff criterion is satisfied when an input distance value is less than the cutoff value.

8. The method of claim 1, wherein determining that the first access request is suspicious is further based on determining that the first folder is identified within one of the set of group accessed folders of a second user group of the plurality of user groups, wherein the second user group is not considered to be nearby the first user group.

9. The method of claim 1, wherein determining the plurality of user groups comprises:

clustering the plurality of users into the plurality of user groups according to a second clustering process, wherein the second clustering process utilizes the plurality of folders as features.

10. The method of claim 1, wherein the alert causes one or more actions to be performed including one or more of:

transmitting a message to an administrator of the enterprise;

causing the first access request to be blocked from reaching an intended destination; or causing a security measure to be activated to deny additional access requests from being successfully serviced that are caused to be issued by the first user, issued from a first electronic device of the first user, or include a network address utilized by the first electronic device.

11. The method of claim 1, wherein the plurality of access requests includes one or more of:

one or more Common Internet File System (CIFS) or Server Message Block (SMB) requests; or one or more Hypertext Transport Protocol (HTTP) requests.

12. The method of claim 1, further comprising:

receiving the first access data from a monitoring module that lies on a path of communication between a plurality of electronic devices and one or more servers that provide access to the plurality of files; or receiving the first access data from the one or more servers that provide access to the plurality of files or one or more server end stations that implement the one or more servers.

13. A non-transitory computer-readable storage medium having instructions which, when executed by one or more processors of a computer, cause the computer to implement a suspicious access detection module to perform operations to detect suspicious access requests from access requests that identify different ones of a plurality of files, the plurality of files being organized within a plurality of folders, the operations comprising:

determining, based on a first access data describing a plurality of access requests sent on behalf of a plurality of users of an enterprise, the following:

a set of user accessed folders, for each respective one of the plurality of users, that identifies those of the plurality of folders that include those of the files that were identified by those of the plurality of access requests sent on behalf of the respective one of the users, a plurality of user groups determined based on similarities between the sets of user accessed folders of the plurality of users, a set of group accessed folders, for each respective one of the plurality of user groups, that identifies those of the plurality of folders in the sets of user accessed folders determined for the respective ones of the users in the respective one of the user groups, and for each of the plurality of user groups, which of the others of the plurality of user groups are considered nearby that user group based on a level of commonality between folders in set of group accessed folders determined for that user group and the sets of group accessed folders determined for the respective ones of the others of the plurality of user groups;

determining, based on a second access data describing at least a first access request, that the first access request is suspicious, wherein the first access request identifies a first file of the plurality of files and was issued on behalf of a first user of the plurality of users, wherein the first user is determined to belong to a first user group of the plurality of user groups, wherein the determining that the first access request is suspicious includes determining that the first file is included in a first folder of the plurality of folders and that the first folder is not within the respective sets of group accessed folders determined for the first user group and those of the user groups determined to be nearby the first user group, wherein the first folder being within the set of group accessed folders determined for the first user group would be considered regular and non-suspicious and the first folder being within the sets of group accessed folders determined for user groups determined to be nearby the first user group would be considered irregular but not suspicious; and causing an alert to be generated responsive to the first access request being determined to be suspicious.

14. The non-transitory computer-readable storage medium of claim 13, wherein the operations further comprise:

removing, from the first access data, data describing those of the plurality of access requests that identify those of the plurality of files that are included in a particular set of one or more folders of the plurality of folders, wherein the particular set of one or more folders includes:

those of the plurality of folders determined to have been accessed by more than a first threshold amount of users of the enterprise within a time period, or those of the plurality of folders determined to have been accessed by fewer than a second threshold amount of users of the enterprise within the time period.

15. The non-transitory computer-readable storage medium of claim 13, further comprising one or more of:

removing, from the first access data, data describing those of the plurality of access requests issued on behalf of an administrative user of the plurality of users;

removing, from the first access data, data describing those of the plurality of access requests issued responsive to automated system processes as opposed to purposeful actions of the plurality of users; or removing, from the first access data, data describing those of the plurality of access requests that identify those of the plurality of files included in those of the plurality of folders that have been accessed by only one user of the plurality of users.

16. The non-transitory computer-readable storage medium of claim 13, wherein said determining, for each of the plurality of user groups, which of the others of the plurality of user groups are considered nearby that user group comprises:

calculating a distance value between each pair of the plurality of user groups to yield a plurality of distance values, wherein the calculating is based on identifying common folders existing in the respective sets of group accessed folders.

17. The non-transitory computer-readable storage medium of claim 16, wherein said determining, for each of the plurality of user groups, which of the others of the plurality of user groups are considered nearby that user group further comprises:

determining, based on the calculated distance values, a cutoff criterion that can be used to identify nearby user groups.

18. The non-transitory computer-readable storage medium of claim 17, wherein the nearby user groups for the first user group include any of the others of the plurality of user groups in which the distance value between the first user group and the other user group satisfies the cutoff criterion.

19. The non-transitory computer-readable storage medium of claim 17, wherein determining the cutoff criterion comprises:

clustering the plurality of determined distance values into at least two clusters using a first clustering process, wherein the cutoff criterion is based on an identified cutoff value separating a first cluster and a second cluster of the at least two clusters, and wherein the cutoff criterion is satisfied when an input distance value is less than the cutoff value.

20. The non-transitory computer-readable storage medium of claim 13, wherein determining that the first access request is suspicious is further based on determining that the first folder is identified within one of the set of group accessed folders of a second user group of the plurality of user groups, wherein the second user group is not considered to be nearby the first user group.

21. The non-transitory computer-readable storage medium of claim 13, wherein determining the plurality of user groups comprises:

clustering the plurality of users into the plurality of user groups according to a second clustering process, wherein the second clustering process utilizes the plurality of folders as features.

22. The non-transitory computer-readable storage medium of claim 13, wherein the alert causes one or more actions to be performed including one or more of:

transmitting a message to an administrator of the enterprise;

causing the first access request to be blocked from reaching an intended destination; or causing a security measure to be activated to deny additional access requests from being successfully serviced that are caused to be issued by the first user, issued from a first electronic device of the first user, or include a network address utilized by the first electronic device.

23. The non-transitory computer-readable storage medium of claim 13, wherein the plurality of access requests includes one or more of:

one or more Common Internet File System (CIFS) or Server Message Block (SMB) requests; or one or more Hypertext Transport Protocol (HTTP) requests.

24. The non-transitory computer-readable storage medium of claim 13, wherein the operations further comprise:

receiving the first access data from a monitoring module that lies on a path of communication between a plurality of electronic devices and one or more servers that provide access to the plurality of files; or receiving the first access data from the one or more servers that provide access to the plurality of files or one or more server end stations that implement the one or more servers.

\* \* \* \* \*